US012592859B2

(12) United States Patent
Zhang

(10) Patent No.: US 12,592,859 B2
(45) Date of Patent: Mar. 31, 2026

(54) DATA PROCESSING METHOD AND DEVICE, READABLE STORAGE MEDIUM AND PROGRAM PRODUCT

(71) Applicant: Tencent Technology (Shenzhen) Company Limited, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 350 days.

(21) Appl. No.: 18/197,498

(22) Filed: May 15, 2023

(65) Prior Publication Data

US 2023/0283529 A1 Sep. 7, 2023

Related U.S. Application Data

(63) Continuation of application No. PCT/CN2022/113279, filed on Aug. 18, 2022.

(30) Foreign Application Priority Data

Sep. 10, 2021 (CN) .......................... 202111061875.9

(51) Int. Cl.
*H04L 41/147* (2022.01)
*H04W 28/08* (2023.01)
*H04W 28/24* (2009.01)

(52) U.S. Cl.
CPC ....... *H04L 41/147* (2013.01); *H04W 28/0967* (2020.05); *H04W 28/24* (2013.01)

(58) Field of Classification Search
None
See application file for complete search history.

(56) References Cited

U.S. PATENT DOCUMENTS

2006/0002377 A1* 1/2006 Skog ..................... H04L 47/808
455/452.2
2018/0262924 A1 9/2018 Dao et al.
(Continued)

FOREIGN PATENT DOCUMENTS

CN 108781381 A 11/2018
CN 110661837 A 1/2020
(Continued)

OTHER PUBLICATIONS

Tencent Technology, WO, PCT/CN2022/113279, Nov. 21, 2022, 3 pgs.
(Continued)

*Primary Examiner* — Khaled M Kassim
(74) *Attorney, Agent, or Firm* — Morgan, Lewis & Bockius LLP

(57) ABSTRACT

The present application discloses a data processing method and device, a readable storage medium and a program product. The method is performed by a terminal device, the terminal device including an application program client and an analysis and prediction function component. The method includes: generating a QoS parameter prediction request by the application program client corresponding to a protocol data unit session, and transmitting the QoS parameter prediction request to the analysis and prediction function component; and predicting, by the analysis and prediction function component, predicted QoS parameters corresponding to a QoS flow for the application program client based on the QoS parameter prediction request, and transmitting the predicted QoS parameters to the application program client, the QoS flow being associated with a business data packet provided by the application program client. With the present application, the ability of the application program client to (Continued)

perceive and predict the QoS parameters can be extended in a QoS mechanism.

20 Claims, 10 Drawing Sheets

(56) References Cited

U.S. PATENT DOCUMENTS

| | | | | |
|---|---|---|---|---|
| 2020/0112907 A1* | 4/2020 | Dao | .................. | H04M 15/8016 |
| 2021/0112441 A1* | 4/2021 | Sabella | ................. | H04W 24/04 |
| 2022/0110024 A1* | 4/2022 | Consoli | ................. | H04W 28/24 |
| 2024/0187932 A1* | 6/2024 | Zhu | ................... | H04W 28/0992 |

FOREIGN PATENT DOCUMENTS

| | | | |
|---|---|---|---|
| CN | 110996302 | A | 4/2020 |
| CN | 112566164 | A | 3/2021 |
| CN | 112740623 | A | 4/2021 |
| CN | 113784397 | A | 12/2021 |
| WO | WO 2020060334 | A1 | 3/2020 |
| WO | WO 2020147927 | A1 | 7/2020 |

OTHER PUBLICATIONS

Tencent Technology, IPRP, PCT/CN2022/113279, Mar. 5, 2024, 3 pgs.

Ericsson, "Pseudo-CR on QoS Notifications to V2X UE", Document: S6-200385, 3rd Generation Partnership Project (3GPP), TSG-SA WG6 Meeting #36-e, E-meeting, Feb. 24-28, 2020, 5 pgs, Retrieved from the Internet: https://ftp.3gpp.org/tsg_sa/WG6_MissionCritical/TSGS6_036e/Docs/S6-200385.zip.

Huawei, "eNESQO TR: Predictive QoS Areas of Improvement", Document: A-200061, 3rd Generation Partnership Project (3GPP), 5GAA Working Group 2 Meeting, 13th WG Brussels Meeting, Feb. 3-5, 2020, 9 pgs, Retrieved from the Internet: https://ftp.3gpp.org/tsg_sa/WG2_Arch/TSGS2_138e_Electron/Docs/S2-2002800.zip.

5GAA Automotive Association, "5GS Enhancements for Providing Predictive QoS in C-V2X", Technical Report: TR-200055, 5G Automotive Association, Working Group System Architecture and Solution Development, Feb. 2020, 60 pgs, Retrieved from the Internet: https://5gaa.org/contact-us/.

Tencent Technology, Extended European Search Report, EP Patent Application No. 22866368.8, Mar. 22, 2024, 12 pgs.

Tencent Technology, ISR, PCT/CN2022/113279, Nov. 21, 2022, 3 pgs.

* cited by examiner

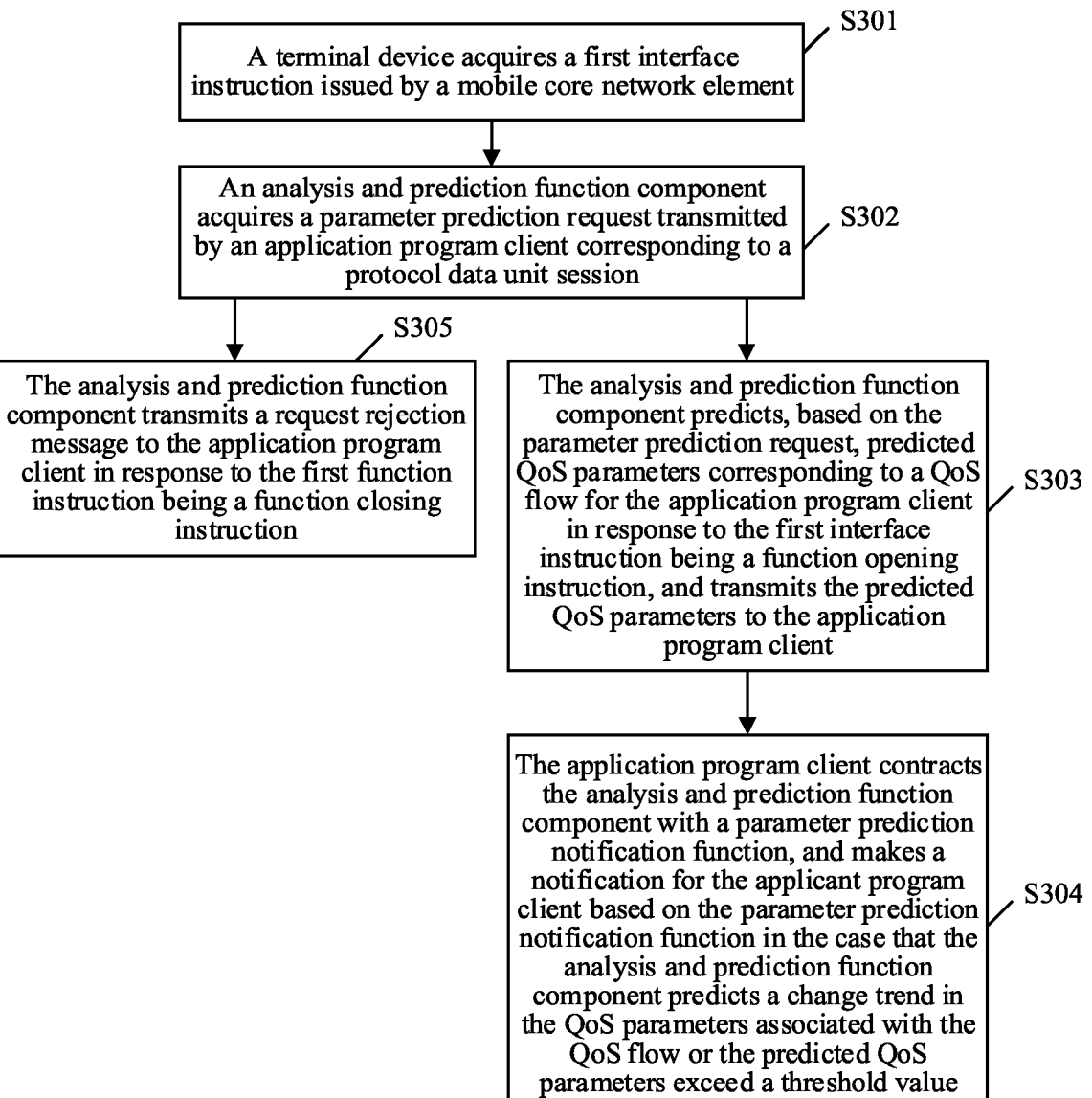

S301

A terminal device acquires a first interface instruction issued by a mobile core network element

S302

An analysis and prediction function component acquires a parameter prediction request transmitted by an application program client corresponding to a protocol data unit session

S305

The analysis and prediction function component transmits a request rejection message to the application program client in response to the first function instruction being a function closing instruction

S303

The analysis and prediction function component predicts, based on the parameter prediction request, predicted QoS parameters corresponding to a QoS flow for the application program client in response to the first interface instruction being a function opening instruction, and transmits the predicted QoS parameters to the application program client

S304

The application program client contracts the analysis and prediction function component with a parameter prediction notification function, and makes a notification for the applicant program client based on the parameter prediction notification function in the case that the analysis and prediction function component predicts a change trend in the QoS parameters associated with the QoS flow or the predicted QoS parameters exceed a threshold value

FIG. 5

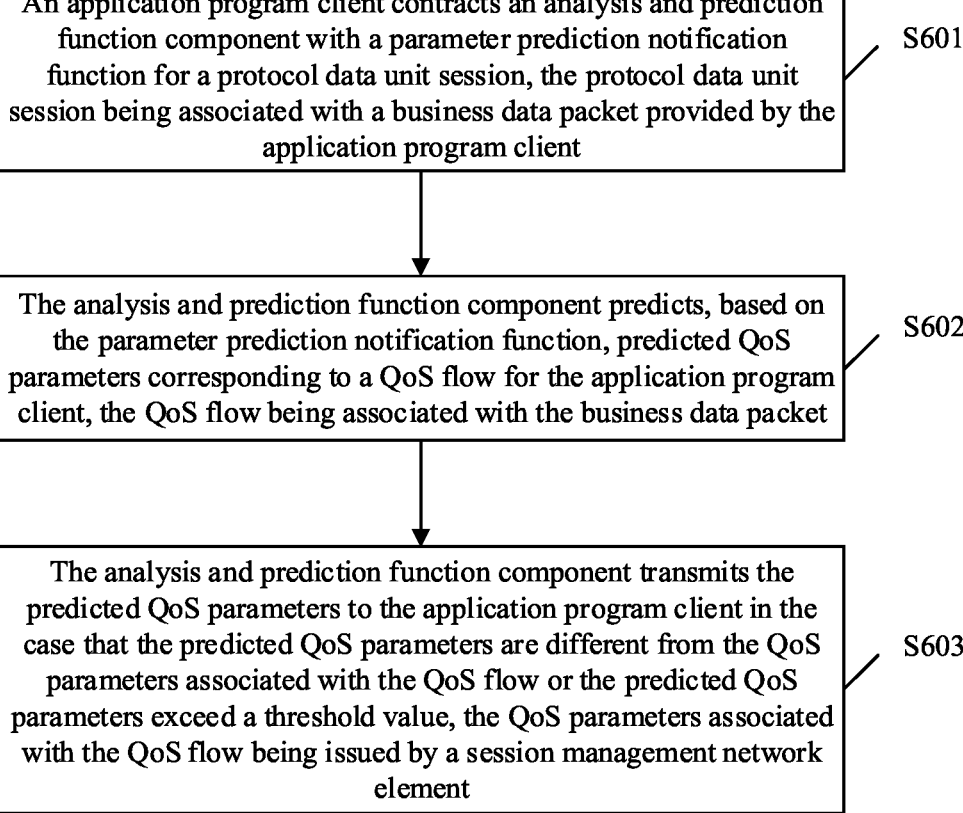

An application program client contracts an analysis and prediction function component with a parameter prediction notification function for a protocol data unit session, the protocol data unit session being associated with a business data packet provided by the application program client    S601

The analysis and prediction function component predicts, based on the parameter prediction notification function, predicted QoS parameters corresponding to a QoS flow for the application program client, the QoS flow being associated with the business data packet    S602

The analysis and prediction function component transmits the predicted QoS parameters to the application program client in the case that the predicted QoS parameters are different from the QoS parameters associated with the QoS flow or the predicted QoS parameters exceed a threshold value, the QoS parameters associated with the QoS flow being issued by a session management network element    S603

FIG. 8

DATA PROCESSING METHOD AND DEVICE, READABLE STORAGE MEDIUM AND PROGRAM PRODUCT

CROSS-REFERENCE TO RELATED APPLICATIONS

The present application is a continuation application of PCT Patent Application No. PCT/CN2022/113279, entitled "DATA PROCESSING METHOD AND DEVICE, AND READABLE STORAGE MEDIUM" filed on Aug. 18, 2022, which claims priority to the Chinese Patent Application No. 202111061875.9, filed on Sep. 10, 2021, with the State Intellectual Property Office of the People's Republic of China and entitled "DATA PROCESSING METHOD AND DEVICE, AND READABLE STORAGE MEDIUM", all of which are incorporated herein by reference in their entirety.

FIELD OF THE TECHNOLOGY

The present application relates to the field of communication technologies, and more particularly to data processing.

BACKGROUND OF THE DISCLOSURE

With the popularity and rapid development of intelligent terminals, in order to meet user's requirements for different quality of services of different applications, a network needs to be able to allocate and schedule resources according to needs of business to provide different quality of services for different business flows. Therefore, quality of service (QoS) comes into being. QoS refers to the ability of a network to provide required services for specified network communications by using various basic technologies. QoS, as a QoS guarantee mechanism of the network, may be used to guarantee network delay, bit error rate, data transmission rate, etc. so as to make more rational use of network resources according to QoS.

Currently, in the 5th generation mobile communication technology (abbreviated as 5G), a 5G QoS model is proposed in order to ensure end-to-end QoS. The 5G QoS model is based on a QoS flow, and can support a guaranteed bit rate QoS flow (GBR QoS Flow) and a non-guaranteed bit rate QoS flow (Non-GBR QoS Flow). In related technologies, a session management function (SMF) in a 5G core network generates a QoS rule according to a policy control and charging (PCC) rule transmitted by a policy control network function (PCF). When a protocol data unit session (PDU Session) is established, the SMF will transmit the QoS rule to user equipment (UE), and also transmit a flow-level QoS parameter to the UE. For example, the GBR QoS flow may include QoS parameters such as a guaranteed flow bit rate (GFBR), a maximum flow bit rate (MFBR), or optional averaging window for an uplink (UL) and a downlink (DL) respectively. In response to receiving the QoS rule and the QoS parameters, for an uplink business flow, the UE may map a business data packet provided by an application program client on the UE to a corresponding QoS flow using the QoS rule. In addition, the 5G system also supports an alternative QoS configuration mechanism, namely, the SMF can provide an alternative QoS profile to a radio access network (RAN). In response to the failure to satisfy existing QoS parameters, the RAN will detect whether QoS parameters (e.g., a guaranteed flow bit rate, a packet error rate, and a packet delay budget) defined in a certain alternative QoS profile can be satisfied; if so, the RAN will transmit a relevant notification to the SMF; and the SMF will further update the corresponding QoS parameters and transmit them to the UE.

It can thus be seen that only the adjustment of QoS parameters at a network side is involved in related technical solutions. However, for the application program client on the UE, the application program client completely cannot perceive the QoS parameters and change conditions thereof.

SUMMARY

In view of this, embodiments of the present application provide a data processing method and device, a readable storage medium and a program product, which can extend the ability of an application program client to perceive and predict QoS parameters in a QoS mechanism.

An aspect of an embodiment of the present application provides a data processing method performed by a computer device acting as a terminal device, the terminal device including an application program client and an analysis and prediction function component, the method including:

the application program client generates a QoS parameter prediction request, and transmits the QoS parameter prediction request to the analysis and prediction function component; and the analysis and prediction function component predicts predicted QoS parameters corresponding to a QoS flow for the application program client based on the QoS parameter prediction request, and transmits the predicted QoS parameters to the application program client, the QoS flow being associated with a business data packet provided by the application program client.

An aspect of an embodiment of the present application provides a computer device acting as a terminal device, including: a processor, a memory, and a network interface, where the processor is connected to the memory and the network interface; the network interface is configured to provide a data communication function; the memory is configured to store a computer program therein; and the processor is configured to invoke the computer program to cause the computer device to perform the method in the embodiment of the present application.

An aspect of an embodiment of the present application provides a non-transitory computer-readable storage medium having stored therein a computer program, which is applicable for the processor to load to perform the method in the embodiment of the present application.

An aspect of an embodiment of the present application provides a computer program product or a computer program. The computer program product or the computer program includes a computer instruction, which is stored in a non-transitory computer-readable storage medium. A processor of the computer device or network element device reads the computer instruction from the computer-readable storage medium, and the processor executes the computer instruction, causing the computer device or the network element device to perform the method in the embodiment of the present application.

According to the embodiments of the present application, the application program client on the terminal device may be supported to generate the QoS parameter prediction request, and the QoS parameter prediction request is transmitted to the analysis and prediction function component in the terminal device; and the analysis and prediction function component further predicts the predicted QoS parameters corresponding to the QoS flow for the application program client based on the QoS parameter prediction request, and transmits the predicted QoS parameters to the application program client. It can thus be seen that the analysis and prediction function component can predict the corresponding QoS parameters for the application program client in response to the QoS parameter prediction request transmitted by the application program client operated on the terminal device, such that the application program client may make adaptive adjustments subsequently based on the predicted QoS parameters, so as to expand the ability of the application program client to perceive and predict QoS parameters in a QoS mechanism.

BRIEF DESCRIPTION OF THE DRAWINGS

FIG. 5 is a schematic flowchart of a data processing method provided by an embodiment of the present application.

FIG. 8 is a schematic flowchart of a data processing method provided by an embodiment of the present application.

DESCRIPTION OF EMBODIMENTS

The technical solutions in the embodiments of the present application will be described clearly and completely below in conjunction with accompanying drawings of the present application. Of course, the described embodiments are merely some embodiments, rather than all embodiments, of the present application. Based on the embodiments of the present application, all other embodiments derived by a person of ordinary skill in the art without creative efforts shall fall within the protection scope of the present application.

The technical solutions of the embodiments of the present application may be applied to various communication systems, such as: Global System for Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunications System (UMTS), Worldwide Interoperability for Microwave Access (WiMAX) communication system, future 5th Generation (5G) mobile communication system or subsequently evolved mobile communication systems.

Figures 1, 2:
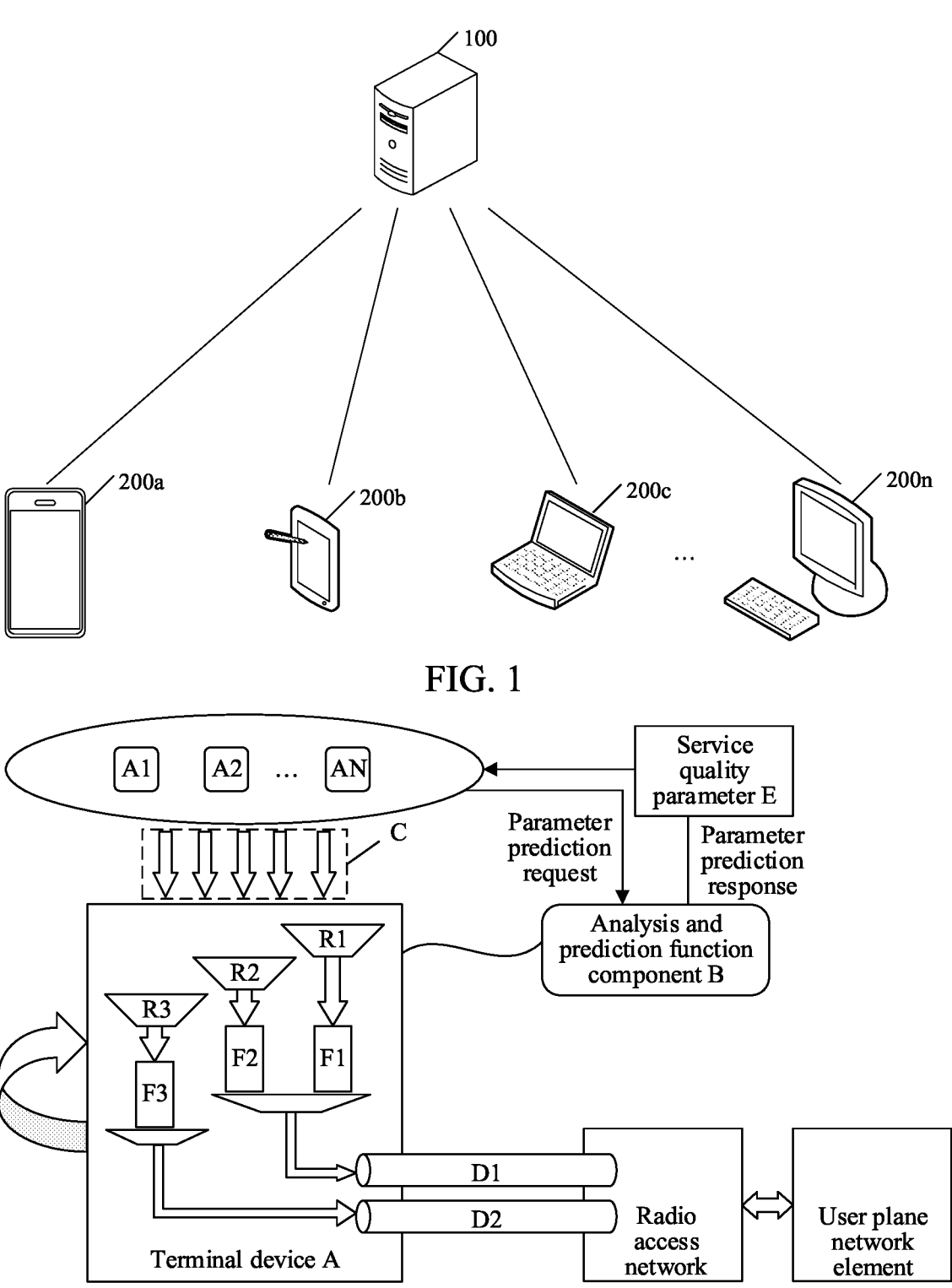
FIG. 1 is a schematic diagram of a system architecture provided by an embodiment of the present application.
FIG. 2 is a schematic diagram of a data processing scenario provided by an embodiment of the present application.

FIG. 1 is a schematic diagram of a system architecture provided by an embodiment of the present application. As shown in FIG. 1, the system architecture may be applied to business scenarios that support uplink businesses (such as a streaming business), such as video conferencing, video-on-demand, and distance education and other multimedia real-time businesses, and corresponding applications corresponding these different businesses require different QoS requirements, resulting in the rapid growth of QoS requirements from various applications. QoS is a qualitative agreement about information transmission and sharing, for example, transmission delay time and guaranteed bit rates of data transmission, between a network and users and between users communicating with each other on the network, and is a technology used to solve the problems of network delay and congestion, etc. It can be understood that QoS is necessary for some critical applications and multimedia applications, and when a network is overloaded or congested, QoS can ensure that important business flows (such as audio and video flows generated during live broadcasting) will not be delayed or discarded, while ensuring efficient operation of the network.

It can be understood that with the rapid development of network multimedia technologies, various types of applications emerge in endlessly. Especially for the 5th generation mobile communication technology (abbreviated as 5G) with the features of high speed, low delay and large connection, the combination of QoS and 5G is conducive to effectively allocate network bandwidth and make more rational use of network resources.

As shown in FIG. 1, the system architecture may include a business server 100 and terminal clusters, the terminal cluster including: a terminal device 200a, a terminal device 200b, a terminal device 200c, . . . , and a terminal device 200n, where a communication connection may exist between the terminal clusters. For example, a communication connection exists between the terminal device 200a and the terminal device 200b, and a communication connection exists between the terminal device 200a and the terminal device 200c. Meanwhile, any terminal device in the terminal cluster may have a communication connection with the business server 100. For example, the terminal device 200a has a communication connection with the business server 100. The above-mentioned communication connection does not define a connection mode, and may be, for example, performed via a 4G radio access mode or a 5G radio access mode, etc., which will not be limited in the present application.

It is to be understood that each terminal device in the terminal cluster as shown in FIG. 1 may be installed with an application program client, which, when being operated in each terminal device, may perform data interaction respectively with the business server 100 as shown in FIG. 1, so that the business server 100 may receive business data from each terminal device. The application program client may be an application program client for a live-broadcasting application, a social communication application, an instant communication application, a game application, a short video application, a video application, a music application, a shopping application, a novel application, a payment application, a browser, having functions of displaying data information such as text, images, audio and video. The application program client may be an independent client, or may be an embedded sub-client integrated in a client (such as an instant messaging client, a social client, or a video client), which will not be limited herein.

Taking a live-broadcasting application as an example, the business server 100 may be a set of multiple servers including a backend server, a data processing server and the like corresponding to the live-broadcasting application. Therefore, each terminal device may perform data transmission with the business server 100 via an application program client corresponding to the live-broadcasting application. For example, an anchor user may perform live broadcasting via an application program client corresponding to a live-broadcasting application installed on a terminal device (for example, a terminal device 200a) held by the anchor user, and other terminal devices (for example, a terminal device 200b, a terminal device 200c and a terminal device 200n) may then participate in the live broadcasting through the business server 100. Here, live broadcasting refers to a technology of collecting anchor side data via an audio and video collection device, performing a series of processing, such as compressing the anchor side data into a viewable and spreadable video flow via video encoding (or compressing the anchor side data into a listenable and spreadable audio flow via audio encoding), and outputting the same to a viewing user side.

It is to be indicated that: in mobile communications, the system architecture as shown in FIG. 1 may further include a radio access network (RAN), a bearer network (i.e. a transmission network) and a core network, where a plurality of access network elements (which may also be referred to as access network devices, such as a 5G base station gNB) may be deployed in the access network and are mainly responsible for the access and management of a terminal device on a radio side. The bearer network may be composed of switching and routing devices of a series of operators, and mainly configured to transmit control signaling and user data between the radio access network and the core network. The core network may then deploy a series of core network elements (which may also be referred to as core network devices, and a "network element" may also be referred to as a "network function"). These core network elements cooperate to perform authentication, charging, mobility management, etc. on a terminal device. In some embodiments, the core network elements may include a mobility management entity (MME), a broadcast multicast service center (BMSC), etc. or may also include corresponding functional entities in a 5G system, such as a session management network element, a mobility management network element and a policy control network element. The core network elements and the access network elements may be independent and different physical devices, where functions of the core network elements and functions of the access network elements are integrated on the same physical device, or the functions of part of the core network elements and the functions of part of the access network elements are integrated on one physical device. The terminal device may be fixed in position or mobile.

In order to facilitate the understanding and description of the subsequent embodiments, the network elements or devices mainly involved in the embodiments of the present application will be briefly introduced herein, specifically as follows:

(1) session management function (SMF): mainly responsible for session establishment, modification and release, user plane selection and control, and UE IP (user equipment, i.e., a terminal device or a user equipment; IP, Internet Protocol) address assignment, etc. In an embodiment of the present application, SMF may also be referred to as a session management network element.

(2) User plane function (UPF): mainly responsible for data routing and forwarding in a user plane of a mobile core network and interconnected with an external data network (such as an operator business, Internet or a third-party business). UPF is a main module configured to process user plane data in 5G core network. In the embodiments of the present application, UPF may also be referred to as a user-plane network element.

(3) Policy control function (PCF): mainly responsible for managing network behaviors using a unified policy framework and performing relevant policies in conjunction with user information in a unified data repository (UDR). In an embodiment of the present application, PCF may also be referred to as a policy control network element.

(4) An access network element: serving as an access device for a terminal device to wirelessly access a mobile communication system, which may be a base station (NodeB), an evolved base station (eNodeB), a base station (gNodeB, gNB) in a 5G mobile communication system, a base station in a future mobile communication system or an access node in a wireless fidelity (WiFi) system, etc.; or may also be a radio controller in a cloud radio access network (CRAN) scenario; or may be a relay station, an access point, a vehicle-mounted device, a wearable device, a network device in a relay station, an access point, a vehicle-mounted device, a wearable device and a future 5G network or a network device in a future evolved public land mobile network (PLMN), etc. Specific technologies and specific device forms used by the access network element are not defined in the embodiments of the present application.

(5) Terminal device: which may refer to user equipment (UE), an access terminal, a terminal in Vehicle to X (V2X) communication, a user unit, a user station, a mobile station, a mobile station, a remote station, a remote terminal, a mobile device, a user terminal, a wireless communication device, a user agent, or a user apparatus. The terminal device may also be a cellular phone, a cordless phone, a session initiation protocol (SIP) phone, a wireless local loop (WLL) station, a personal digital assistant (PDA), a handheld device having a wireless communication function, a computing device or other processing device, a vehicle-mounted device and a wearable device connected to a wireless modem, a terminal device in a future 5G network, a terminal device in a future evolved public land mobile communication network (PLMN), etc., which will not be limited in the embodiments of the present application. The terminal device may also include a V2X device, for example a vehicle or an on board unit (OBU) in the vehicle.

It is to be indicated that: the session management network element, the user plane network element, the policy control network element and the access network element are only one name, which does not constitute a definition for a device itself. For example, the session management network element may also be referred to as a session management function entity, or as a session management function, etc. Device's names are not limited in the present application. In a 5G network and other future networks, the network elements mentioned in the embodiments of the present application may also be other names, which are not limited herein.

In some embodiments, the session management network element, the user plane network element and the policy control network element may be separate network elements respectively, or may also be realized by a plurality of network elements together, or may also be taken as a function module in one network element, which will not be limited in the embodiments of the present application.

In some embodiments, the system architecture shown in FIG. 1 may be applied to the 5G network and other possible future networks, which will not be particularly limited in the embodiments of the present application.

For ease of understanding, the description will be made by taking the terminal device 200a and the terminal device 200b as examples. In a live-broadcasting business scenario, assuming that an anchor user performs live broadcasting via the terminal device 200a, the terminal device 200a may collect original audio and video data of the anchor user in real time, and perform pre-processing (e.g., image beautification and stylization) on the original audio and video data, and further encoding processing (i.e. digitization) and processing (e.g., audio and video mixing, packaging and encapsulation, etc.) on the pre-processed audio and video data, so as to obtain an available audio and video flow (i.e., a collective term of an audio flow and a video stream). The encoding may reduce the amount of data by compressing the audio and video data, and facilitate data pushing, pulling and storage of the audio and video data, so that the storage and transmission efficiency can be greatly improved. Commonly used encoding modes include: a constant bit rate (CBR, a compression mode with a fixed sampling rate) and a variable bit rate (VBR). For video data, commonly used encoding standards include: H. 265 (H. 265-high efficiency video coding (HEVC), an efficient video encoding standard approved by the International Telecommunication Union in 2013), H. 264 (a highly compressed digital video codec standard jointly proposed by the International Telecommunication Union and the International Organization for Standardization), moving picture experts group 4 (MPEG-4, a scheme for low transmission rate applications proposed by the moving picture experts group in 1999), etc., which may be encapsulated as a Matroska video file (MKV), an audio video interleaved (AVI), MP4 (an abbreviation of MPEG-4); and other file formats. For audio data, the commonly used encoding standards include: G. 711 (a customized set of voice compression standards from the International Telecommunication Union), advanced audio coding (AAC, a MPEG-2-based audio encoding technology launched in 1997), Opus (a lossy vocoding format), etc., which may be encapsulated into MP3 (Moving Picture Experts Group Audio Layer III), OGG (OGGVobis (oggVorbis)), AAC, and other file formats. The encoding modes for a client are not limited in the present application.

Furthermore, the terminal device 200a can transmit the encoded audio and video flow to the business server 100. For example, in a 5G network, the business server 100 is deployed in a data network (DN) outside a mobile communication network, such as Internet, a wireless application protocol (WAP), intranet, etc. The terminal device 200a may transmit the audio and video flow to a base station; and then, the base station forwards the audio and video flow to a core network element UPF (i.e., a user plane network element) in a 5G core network (5G Core, which may be abbreviated as 5GC). After being forwarded by the core network element UPF, the audio and video flow may be transmitted to a business server 100 in an external data network, while other core network elements in the 5G core network are mainly network elements of a control plane, which are responsible for processing signaling and implementing mobility management, session management, policy control, etc., thereby controlling the whole flow. Subsequently, the business server 100 may issue the audio and video flow to other terminal devices in a virtual live-broadcasting room via the core network element UPF and the base station, for example, may issue the audio and video flow to the terminal device 200b; and then, the terminal device 200b may decode the received audio and video flow via relevant hardware or software to obtain an image picture or sound which may be directly displayed, and then may play the corresponding image picture or sound. The audio and video flow may be transmitted between the terminal device 200a and the business server 100 and between the business server 100 and the terminal device 200b via a transmission protocol such as a real time messaging protocol (RTMP), a real time streaming protocol (RTSP), a real-time transport protocol (RTP), a real-time transport control protocol (RTCP), or the like.

It can be understood that the business server in the embodiments of the present application may be an independent physical server, or a server cluster or distributed system composed of a plurality of physical servers, and or a cloud server which provides basic cloud computing services, such as a cloud database, a cloud service, cloud computing, a cloud function, cloud storage, a network service, cloud communication, a middleware service, a domain name service, a security service, CDN, as well as a large data and artificial intelligence platform. The terminal device may be a smart phone, a tablet computer, a notebook computer, a desktop computer, a palmtop computer, a mobile Internet device (MID), a wearable device (e.g., a smart watch, or a smart bracelet), a smart computer, a smart vehicle-mounted device, or other smart terminals which can run the above-mentioned application program client (e.g., an application program client of a live-broadcasting application).

It is to be indicated that: the system architecture described in FIG. 1 may be configured with QoS capabilities in order to further improve the QoS of network businesses. As can be appreciated, the QoS flow is the finest granularity of QoS differentiation in a PDU session (i.e., a protocol data unit session). When the system architecture is applied to a 5G network, the same flow forwarding processing (e.g., scheduling, and admission threshold) will be used for business flow controlled by the same QoS flow. A terminal device may establish one or more PDU sessions with the 5G network. One or more QoS flows may be established in each PDU session. Each QoS flow is identified by a QoS flow identifier (QFI), and one QFI uniquely identifies one QoS flow in the PDU session. Furthermore, each QoS flow corresponds to one data radio bearer (DRB), and one DRB may correspond to one or more QoS flows. Whether one QoS flow is a GBR QoS flow or a Non-GBR QoS flow is determined by a corresponding QoS profile.

The 5G core network supports a PDU connection business between a terminal device and a data network, where the PDU connection business is embodied in the form of a PDU session, the PDU session referring to a data path for communication between the terminal device and the data network. Assuming that a terminal device (e.g., the terminal device 200a) wishes to obtain an application service (e.g., a live-boarding service), the terminal device may initiate a PDU session establishing request to a core network element SMF (i.e., a session management function) in the 5G core network. In the process of establishing the PDU session, the core network element SMF may bind a PCC rule (i.e., a policy control and charging rule) to a QoS flow according to QoS and service requirements. The core network element SMF may allocate QFI for a new QoS flow and derive a QoS profile, a corresponding UPF instruction and a QoS rule thereof from the PCC rule bound to the QoS flow and other information provided by the core network element PCF (i.e., a policy control network element). Then, the core network element SMF may transmit the QoS profile to a radio access network (R)AN (i.e., an access network element), transmit a corresponding UPF instruction to the core network element UPF, and transmit the QoS rule to the terminal device. Furthermore, the core network element SMF may also transmit QoS flow level QoS parameters to the terminal device, the QoS parameters being associated with corresponding QoS rules. Further, after receiving the QoS rules and the QoS parameters, the terminal device may classify and mark an uplink business flow (which may also be referred to as an uplink user plane flow) based on the QoS rules. For example, the business flow (e.g., an audio and video stream) may be mapped to a QoS flow according to the QoS rule, and then the QoS flow may be bound to AN resources (e.g., a data radio bearer (DRB) in a scenario of a 3GPP radio access network). One QoS flow may be associated with one or more QoS rules.

It can be understood that all the business flows may be discarded when a network is congested. However, different QoS may be provided for different business flows in response to the configuration of QoS, that is, different QoS flows correspond to different QoS forwarding treatments. For example, important business data packets with strong real-time performances are preferentially processed. A lower processing priority is provided for ordinary business data packets with poor real-time performances, which are even discarded when the network is congested. That is to say, a network supporting a QoS function can provide a transmission quality service, i.e., a certain level of transmission priority may be given to a certain type of business flows to identify the relative importance thereof. Various priority forwarding policies, congestion avoidance and other mechanisms provided by the network can be used to provide a special transmission service for these business flows. It can be seen from the above that a network environment of QoS is configured to increase the predictability of network performances, and effectively allocate network bandwidth, such that network resources can be used more rationally.

It is to be indicated that: an embodiment of the present application may also provide an alternative QoS profile for a GBR QoS flow for which notification control is enabled. In particular, when a corresponding PCC rule contains relevant information, the core network element SMF may provide a priority list of alternative QoS profiles to the radio access network (R)AN in addition to the QoS profile. When the core network element SMF provides the radio access network (R)AN with a new priority list of alternative QoS profiles (in response to a change in corresponding PCC rule information), the radio access network (R)AN will replace any previously stored list with this new priority list. The alternative QoS profiles may represent a combination of QoS parameters to which a business flow can adapt, where the combination of QoS parameters may include a guaranteed flow bit rate (GFBR), a packet error rate (PER) and a packet delay budget (PDB). In addition, when the radio access network (R)AN transmits a notification indicating that the QoS profile is not satisfied to the core network element SMF and a currently satisfied parameter value matches with the alternative QoS profile, the radio access network (R)AN also includes a reference of the alternative QoS profiles, for indicating the QoS currently satisfied by the radio access network (R)AN. Further, a relevant notification may be transmitted to the core network element SMF; and the core network element SMF may further update corresponding QoS parameters and transmit the same to the terminal device. The QoS parameters may affect a scheduling algorithm and strategy of the radio access network (R)AN for different levels of users and different levels of businesses. For example, a base station may direct resource allocation on a radio side based on the above-mentioned QoS parameters and other core network parameters.

Furthermore, an embodiment of the present application provides a business transmission optimization method. In a case of establishing a PDU session, an application program client (e.g., a live-broadcasting application) corresponding to the PDU session on a terminal device may generate a QoS parameter prediction request. Further, the QoS parameter prediction request may be transmitted to an analysis and prediction function component, where the application program client is operated in the terminal device, and the analysis and prediction function component is also integrated in the terminal device. Further, the analysis and prediction function component may predict, based on the QoS parameter prediction request, predicted QoS parameters corresponding to a QoS flow associated with business data packets of the application program client for the application client, and then transmit the predicted QoS parameters to the application program client. It can be understood that the analysis and prediction function component on the terminal device may predict a parameter change in a QoS flow according to past QoS parameter information (i.e., historical parameter information). For example, a QoS flow X1 is downgraded to a lower GFBR value at a location X2. When this pattern repeatedly appears historically, the analysis and prediction function component may predict that the QoS of the QoS flow X1 may reduce a GFBR at a location X2. Therefore, the analysis and prediction function component may transmit the predicted GFBR (i.e., a predicted QoS parameter) to an application program client X3 corresponding to the QoS flow X1. It can thus be seen that the application program client on the terminal device may perceive the predicted QoS parameters and a change thereof. Therefore, the predicted QoS parameters may be used to execute some relevant processing work. For example, adaptive adjustment may be performed based on the predicted QoS parameters, so that the ability of the application program client to acquire and use the predicted QoS parameters can be expanded in a QoS mechanism. It is to be indicated that: the method provided by the embodiments of the present application is very effective for an uplink streaming business. For example, an application program client may adjust an encoding algorithm based on the predicted QoS parameters, so as to improve the transmission efficiency. Typical scenarios include, for example, gymnasium competition live-broadcasting, concert live-broadcasting, unmanned aerial vehicle image back-transmission, road camera video back-transmission, etc.

To facilitate understanding, referring to FIG. 2, a schematic diagram of a data processing scenario provided by an embodiment of the present application is shown. An implementation process of the data processing scenario is mainly performed inside a terminal device (i.e., UE). The terminal device A in this embodiment of the present application may be any one of terminal devices, for example, the terminal device 200a shown in FIG. 1. As shown in FIG. 2, one or more application program clients may be installed and operated on the terminal device A. It is assumed that there are a total of N application program clients, where N is a positive integer, i.e., an application program client A1, an application program client A2, . . . , and an application client AN, respectively. Each application program client may correspond to one or more businesses. When a user has a business requirement, a corresponding application service may be acquired by selecting to operate an application program client on the terminal device A. In response to the terminal device A establishing an PDU session, the application program client may perform data transmission with a corresponding server side. In this process, the application program client may transmit some uplink information to the server side, e.g., an audio and video flow collected and processed by a camera, a microphone or other devices, i.e., an uplink business flow. In order to improve the QoS of a network business, this embodiment of the present application may provide different forwarding processing for these business flows based on QoS flows.

It is to be indicated that: in the process of establishing the PDU session, a session management network element (i.e., SMF) may determine to establish a QoS flow according to a local policy or a PCC rule transmitted by a policy control network element; and then the session management network element may transmit, via an access and mobility management network element (or also referred to as an access and mobility management function (AMF)) and a radio access network (RAN, i.e., an access network element), a QoS rule and a QoS parameter set composed of corresponding flow level QoS parameters to the terminal device A, where one QoS rule may include a QFI of a relevant QoS flow, a packet filter set, and a priority value. The packet filter set may include a plurality of packet filters, each of which may be an uplink, downlink or bidirectional packet filter. For example, as shown in FIG. 2, the terminal device A may acquire a plurality of QoS rules, such as a QoS rule R1, a QoS rule R2 and a QoS rule R3, as well as a QoS parameter set composed of QoS parameters related to these QoS rules. The session management network element may transmit a QoS profile related to the QoS flow to a radio access network via an access and mobility management network element. Service data flow (SDF) information is transmitted to a user plane network element (i.e., UPF), the SDF information including QoS control information. Further, QoS flows (e.g., a QoS flow F1, a QoS flow F2 and a QoS flow F3) may be established among the terminal device A, the radio access network and the user plane network element, while the radio access network may establish a data radio bearer (DRB, belonging to AN resources) of an air interface according to a QoS profile, and store a binding relationship between the QoS flow and the data radio bearer. For example, the QoS flow F1 and the QoS flow F2 are bound to the data radio bearer D1, and the QoS flow F3 is bound to the data radio bearer D2. It is to be indicated that: the numbers of the QoS flows, the QoS rules and the data radio bearers are not limited in detail in the embodiments of the present application.

Further, with regard to an uplink (UL), when the terminal device A determines to transmit a UL packet, as shown in FIG. 2, it is assumed that a business flow C is generated in a PDU session, the business flow C possibly including business data packets from any one or more application program clients (e.g., an application program client A1) on the terminal device A. For an PDU session of Type IP or Type Ethernet, the terminal device A may evaluate business data packets in the business flow C for UL packet filters in packet filter sets in the QoS rules according to priority values of the QoS rules and a certain priority order, until a matched QoS is found. The terminal device A will discard the business data packet in response to no matched QoS rule is found. For a PDU session of Type Unstructured, a default QoS rule does not contain a packet filter set and allows all uplink business data packets. It is to be indicated that: For the PDU session of Type Unstructured, only the default QoS rules exist. Further, the terminal device A may map the business data packet in the business flow C to the corresponding QoS flow using a QoS flow identifier (QFI) in the matched QoS rule. That is, the business data packet is marked using the QoS flow identifier. For example, as shown in FIG. 2, a part of the business data packets in the business flow C may be mapped to the QoS flow F1 according to a QoS rule R1, a part of the business data packets in the business flow C may be mapped to the QoS flow F2 according to a QoS rule R2, and the part of the business data packets in the business flow C may be mapped to the QoS flow F3 according to a QoS rule R3.

Further, the above-mentioned business data packets may be placed and transmitted on the corresponding data radio bearer according to a binding relationship between these QoS flows and the data radio bearer. For example, the business data packets in the QoS flow F1 and the business data packets in the QoS flow F2 may be transmitted on a data radio bearer D1, and the business data packets in the QoS flow F3 may be transmitted on a data radio bearer D2. In the case that the radio access network receives the business data packets transmitted on the data radio bearer D1 and the radio bearer D2, the business data packets may be transmitted to a user plane network element via an N3 interface. In a case of receiving the business data packets, the user plane network element may, based on the QoS flow identifier, verify whether these business data packets are transmitted using the correct QoS flow, and perform corresponding processing on the business data packets according to the service detection, forwarding, reporting and charging rules, etc. issued by the session management network element.

The processing flow for the downlink (i.e., DL) is not expanded in the embodiments of the present application.

Furthermore, as shown in FIG. 2, an analysis and prediction function component B is also integrated on the terminal device A, and the analysis and prediction function component B may predict corresponding QoS parameters for an application program client on the terminal device A. In an alternative embodiment, the analysis and prediction function component B may provide an analysis and prediction interface for the application program client to invoke. During or after the establishment of the PDU session, an application program client corresponding to the PDU session on the terminal device A may generate and transmit a QoS parameter prediction request to the analysis and prediction function component B. Upon the reception of the QoS parameter prediction request, the analysis and prediction function component B may predict, for the application program client, predicted QoS parameters corresponding to a target QoS flow associated with a business data packet thereof in response to the QoS parameter prediction request, i.e., based on the QoS parameter prediction request, and then return the predicted QoS parameters to the application program client. Taking the application program client A1 as an example, assuming that the business data packet of the application program client A1 is mapped to the QoS flow F1 through the above-mentioned process, the application program client A1 may initiate a QoS parameter prediction request via an analysis and prediction interface; and then the analysis and prediction function component B may determine that the business data packet of the application program client A1 belongs to the QoS flow F1, and then transmit a QoS parameter E (i.e., a predicted QoS parameter) predicted with regard to the QoS flow F1 to the application program client A1 via the analysis and prediction interface. It can be understood that during the PDU session, when the analysis and prediction function component B predicts a possible change in an actual QoS parameter of the QoS flow F1 (i.e., having a change trend), the application program client A1 may be notified. For example, a parameter change notification message may be generated according to the predicted change trend, and may be transmitted to the application program client A1. Then, the application program client A1 may re-initiate a QoS parameter prediction request; or the analysis and prediction function component B may add an analysis and prediction result (i.e., the predicted QoS parameters) to the parameter change notification message and then transmit it to the application program client A1. It may be understood that the analysis and prediction interface provided by the above-mentioned analysis and prediction function component B is an interface inside the terminal device A, and the process of predicting the corresponding QoS parameters is implemented inside the terminal device A.

It is to be indicated that: the application program client may, in response to acquiring the corresponding predicted QoS parameters, use these predicted QoS parameters. For example, when the application program client A1 is a client related to a streaming business (such as a live-broadcasting business), the application program client A1 may perform adaptive adjustment while receiving a QoS parameter E. For example, an encoding algorithm used by the application program client may be adjusted (e.g., adjusting an encoding rate, a compression rate, etc. in need of comprehensive consideration) based on the QoS parameter E, thereby obtaining an optimized business data packet. Then, the terminal device A may still transmit an uplink optimized business data packet through the above-mentioned process. Therefore, the purpose of saving the transmission bandwidth and improving the transmission efficiency can be achieved. It can be understood that the application program client may also perform other processing using the predicted QoS parameters, e.g., adjusting other transmitting parameters of a streaming business thereof. A specific use way of the predicted QoS parameters is an implementation inside the application program client, which will not be limited in the present application.

Figure 3:
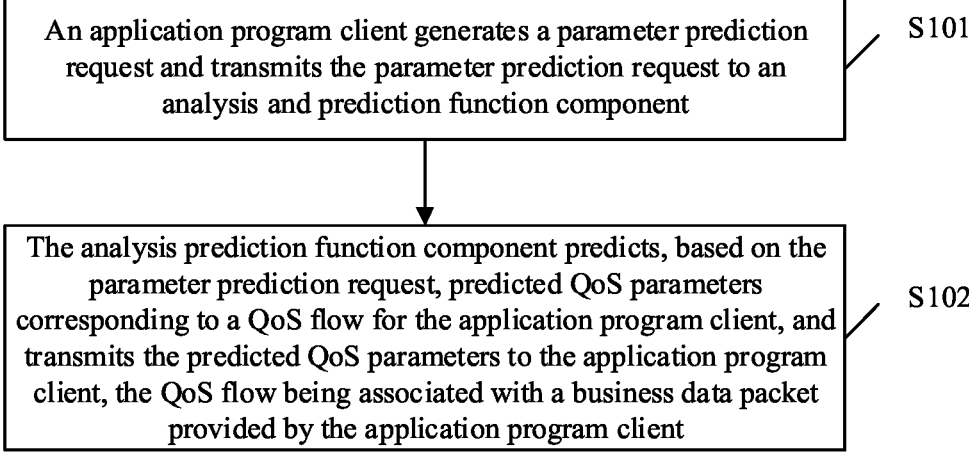
FIG. 3 is a schematic flowchart of a data processing method provided by an embodiment of the present application.

Referring to FIG. 3, a schematic flowchart of a data processing method provided by an embodiment of the present application is shown. The data processing method may be performed by a terminal device. The method provided in this embodiment of the present application may support an analysis and prediction function component in the terminal device to predict parameter changes of a corresponding QoS flow for an application program client on the terminal device according to historical parameter information about QoS parameters (i.e., QoS parameters). As shown in FIG. 3, the data processing method may include at least the following S101-S102.

S101: The application program client generates a QoS parameter prediction request, and transmits the QoS parameter prediction request to the analysis and prediction function component.

Specifically, in order to provide the application program client with a function of predicting a corresponding QoS parameter (i.e., an analysis and prediction function), during or after the terminal device establishes a protocol data unit session (i.e., a PDU session), the application program client corresponding to the protocol data unit session may generate and transmit a QoS parameter prediction request to the analysis and prediction function component (also referred to as an analysis and prediction function module) on the terminal device; and then the analysis and prediction function component may receive the QoS parameter prediction request. The parameter prediction request is configured to request to predict, for the application program client, a QoS flow corresponding to a business flow thereof or QoS parameters (i.e., predicted QoS parameters) of a QoS flow within a corresponding network slice. The application program client is operated on the terminal device and may be a client supporting an uplink business (e.g., transmitting data such as text, image, audio or video to a server side).

In an implementation, the analysis and prediction function component on the terminal device may provide an application programming interface (API) for the application program client to invoke. In the embodiments of the present application, the API may be referred to as an analysis and prediction interface, or may also be referred to as an analysis and prediction function interface. The specific name of this interface is not defined in the present application. The application program client may use a function of predicting relevant QoS parameters provided by the analysis and prediction function component by invoking the analysis and prediction interface. That is, the application program client may transmit the QoS parameter prediction request to the analysis and prediction interface, and the analysis and prediction function component may then acquire the QoS parameter prediction request via the analysis and prediction interface.

S102: The analysis and prediction function component predicts predicted QoS parameters corresponding to a QoS flow for the application program client based on the QoS parameter prediction request, and transmits the predicted QoS parameters to the application program client, the QoS flow being associated with a business data packet provided by the application program client.

Specifically, the analysis and prediction function component of the terminal device may predict the predicted QoS parameters corresponding to the QoS flow for the application program client based on the parameter prediction notification function. The predicted QoS parameters are generated by the analysis and prediction function component. In one embodiment, the predicted QoS parameters that may be provided by the terminal device include one or more of the following QoS parameters: a guaranteed flow bit rate (GFBR), a packet error rate (PER), and a packet delay budget (PDB). The guaranteed flow bit rate represents a lowest bit rate guaranteed by a network to be provided to a QoS flow on an average time window. The packet error rate represents an upper limit of a non-congestion-related data packet loss rate. The packet delay budget characterizes an upper limit of a transmission delay of a business data packet between the terminal device and a termination point N6 interface on a user plane network element.

It is to be indicated that: the above-mentioned QoS flow is associated with a business data packet provided by the application program client. That is, in the case of establishing a protocol data unit session, a session management network element may issue a QoS rule and a QoS parameter set to the terminal device, where the QoS rule may be configured to classify and mark an uplink business flow, and the QoS parameters in the QoS parameter set are associated with the QoS rule. Further, the terminal device may map a business data packet transmitted by the application program client to the corresponding QoS flow based on the received QoS rule, where a target QoS parameter associated with the QoS flow belongs to the QoS parameter set. It may be understood that since the business data packets mapped to the same QoS flow will be marked with the same QoS flow identifier, the analysis and prediction function component may determine a QoS flow to which the business data packets of the application program client belong via the QoS flow identifier.

It is to be indicated that: In the embodiments of the present application, in addition to the guaranteed flow bit rate, the packet error rate and the packet delay budget, the QoS parameter set may further include, but is not limited to, the following QoS parameters: a 5G QoS identifier (5QI), an allocation and retention priority (ARP), a maximum flow bit rate (MFBR), a reflective QoS attribute (RQA), QoS notification control (QNC), and a priority level.

In one implementation, the analysis and prediction function component may analyze and predict QoS parameter changes of a QoS flow corresponding to a business flow on the terminal device. Specifically, in response to receiving the QoS parameter prediction request via the analysis and prediction interface, the analysis and prediction function component on the terminal device may acquire a QoS flow identifier (QFI) associated with the application program client according to the QoS parameter prediction request, and identify the QoS flow corresponding to the QoS flow identifier. Further, the analysis and prediction function component may predict predicted QoS parameters corresponding to the QoS flow based on historical parameter information corresponding to the target QoS parameters. Specifically, the historical parameter information corresponding to the target QoS parameters may be inputted into a pre-trained parameter prediction model through which a parameter change feature corresponding to the historical parameter information may be extracted. Further, the target QoS parameters may be adjusted based on the parameter change feature so as to obtain the predicted QoS parameters corresponding to the QoS flow.

The historical parameter information may include QoS parameter changes of a QoS flow corresponding to a business flow on an application program client within a statistical time period, and the parameter change feature may represent an influencing factor which may cause this change, such as an environmental factor (time, place, etc.), an accessed data network or network slice, etc. For example, in a case of multiple recurrences of a GBR QoS flow being downgraded to a lower GFBR value within a time period (which may be referred to as a target time period, such as 8-10 am) within the statistical time period, the analysis and prediction function component may extract a corresponding parameter change feature W1 (related to the target time period) via the parameter prediction model, further predict that the GFBR value of the QoS flow may be reduced within the target time period based on the parameter change feature W1, adjust the current GFBR value of the QoS flow to a lower value, and then determine the adjusted GFBR as a predicted QoS parameter. Similarly, the PDB corresponding to the QoS flow at a certain location (which may be referred to as a target location, such as a location L) decreases. In a case of repeated occurrence of this case within the statistical time period, the analysis and prediction function component may extract a corresponding parameter change feature W2 (related to a target location) via the parameter prediction model, further predict that the PDB value of the QoS flow may decrease at the target location based on the parameter change feature W2, adjust the current PDB value of the QoS flow to a lower value, and then determine the adjusted PDB as a predicted QoS parameter. Finally, the analysis and prediction function component may transmit the predicted QoS parameters generated by the prediction to the application program client via the analysis and prediction interface, so that the application program client may adjust its business-related transmission parameters (e.g., an encoding rate, a compression rate, etc.).

In some embodiments, the analysis and prediction function component may analyze and predict the overall performance changes of a network slice to which a business flow on the terminal device belongs. Specifically, in response to receiving the QoS parameter prediction request, the analysis and prediction function component on the terminal device may acquire network slice selection assistance information (S-NSSAI) associated with the application program client according to the QoS parameter prediction request, and identify a network slice corresponding to the network slice selection assistance information; and predict the predicted QoS parameters corresponding to the QoS flow based on historical parameter information corresponding to QoS parameters associated with the network slice in the above-mentioned QoS parameter set, where the QoS parameters associated with the network slice include the target QoS parameters. That is, the application program client is operated on the network slice. Specifically, the historical parameter information corresponding to the QoS parameters associated with the network slice is inputted into the pre-trained parameter prediction model in the same way. Parameter change features corresponding to the historical parameter information may be extracted by this parameter prediction model. Further, the QoS parameters associated with the network slice may be adjusted based on the parameter change features, so as to obtain predicted QoS parameters corresponding to this QoS flow (and other QoS flows on the network slice). The historical parameter information may include overall performance changes of a network slice corresponding to a business flow on an application program client within a statistical time period, and the parameter change feature may represent an influencing factor which may cause this change, such as an environmental factor (time, place, etc.), an accessed data network or network slice, etc. For example, within the statistical time period, an average rate of a business flow on a network slice (e.g., a network slice S) is relatively high with a time period or at a place, or the time delay is relatively low. In addition, this case occurs repeatedly. Then, the analysis and prediction function component may generate a corresponding analysis and prediction result (i.e., predicted QoS parameters) via the parameter prediction model. Finally, the analysis and prediction function component on the terminal device may transmit the predicted QoS parameters generated by the prediction to all the application program clients (including the above-mentioned application program client) operated on the network slice via the analysis and prediction interface, and further, these application program clients may adjust the transmitted business data packets related to their businesses. It can be understood that, compared with the above-mentioned QoS flow-based parameter prediction mode, the network slice-based parameter prediction mode takes into account parameter change features of higher dimension. An appropriate parameter prediction mode can be selected according to actual situations, which will not be limited in the present application.

The analysis and prediction function component on the terminal device may transmit the predicted QoS parameters to the application program client via the analysis and prediction interface. In some embodiments, when the application program client is a client for performing a streaming business, the analysis and prediction function component may generate a parameter prediction response message containing the predicted QoS parameters, and then transmit the parameter prediction response message to the application program client. In response to receiving the parameter prediction response message, the application program client may parse the parameter prediction response message to obtain the predicted QoS parameters, then adjust an encoding algorithm used in a current streaming business based on the predicted QoS parameters (e.g., adjust an encoding rate, a compression rate, etc.), and thus generate an optimized business data packet based on the adjusted encoding algorithm and streaming data generated in the streaming business. When the optimized business data packet is uploaded to the server side subsequently, the terminal device may still map the optimized data packet to an appropriate QoS flow for transmission based on the QoS rule. The streaming business refers to a business for transmitting streaming data such as audio, video, text, image and animation in a streaming manner.

Therefore, the application program client may generate the optimized business data packet according to the predicted QoS parameters, so that the possibility of the optimized business data packet meeting future transmission requirements is increased, and the QoS of the streaming business is improved.

It can be understood that the parameter prediction model may be integrated in the analysis and prediction function component, and for example, as a function module in the analysis and prediction function component, used for predicting corresponding predicted QoS parameters according to historical parameter information. The parameter prediction model may be an artificial intelligence (AI) model based on a deep neural network (DNN) and may be obtained by training an initial parameter prediction model. In one implementation, sample parameter information (including initial QoS parameters, sample environment information and changed QoS parameters) obtained by collecting a large number of sample terminal devices may be inputted into the initial parameter prediction model. Then, sample parameter change features corresponding to the initial QoS parameters and the sample environment information may be extracted through a feature extraction layer in the initial parameter prediction model. Further, corresponding sample predicted QoS parameters may be generated based on the sample parameter change features in an output layer of the initial parameter prediction model. Furthermore, the sample predicted QoS parameters may be outputted, and then a loss function may be generated according to the sample predicted QoS parameters and the changed QoS parameters. Further, model parameters of the initial parameter prediction model may be adjusted based on the loss function until the model converges, thereby obtaining a well-trained parameter prediction model. Based on the historical parameter information, the parameter change features may be accurately determined by the parameter prediction model based on the historical parameter information.

Figure 4:
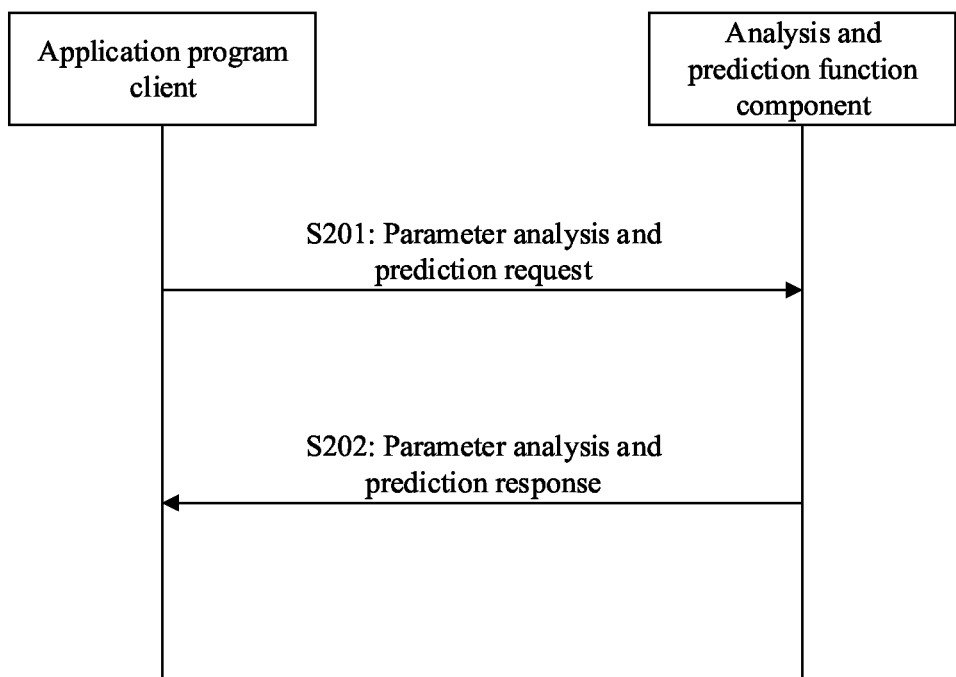
FIG. 4 is a schematic diagram of interactions in a data processing process provided by an embodiment of the present application.

Referring to FIG. 4, a schematic diagram of interactions in a data processing process provided by an embodiment of the present application is shown. As shown in FIG. 4, the data processing process may include the following steps:

S201: An application program client on a terminal device corresponding to a protocol data unit session, duration or after the establishment of the protocol data unit session by the terminal device, transmits a parameter analysis and prediction request (i.e., a QoS parameter prediction request) to an analysis and prediction function component (which may provide an analysis and prediction function); and S202: The analysis and prediction function component may, upon receiving the parameter analysis and prediction request via an analysis and prediction interface, determine a QoS flow or a network slice to which a business data flow of the application program client belongs, and transmit parameter prediction information (i.e., predicted QoS parameters) about the QoS flow or the network slice corresponding to the QoS flow of the application program client to the application program client.

In addition, an embodiment of the present application further provides a parameter prediction notification function. The application program client may provide predicted parameter change information via the parameter prediction notification function. The specific process may refer to S304 in the corresponding embodiment of subsequent FIG. 5.

In the embodiments of the present application, the application program client corresponding to the protocol data unit session on the terminal device may be supported to generate a QoS parameter prediction request, and the QoS parameter prediction request is transmitted to the analysis and prediction function component in the terminal device. Further, the analysis and prediction function component may predict predicted QoS parameters corresponding to the QoS flow for the application program client based on the QoS parameter prediction request, and finally transmit the predicted QoS parameters to the application program client. It can thus be seen that the analysis and prediction function component, during or after the establishment of the protocol data unit session by the terminal device, may predict the corresponding QoS parameters for the application program client in response to the QoS parameter prediction request transmitted by the application program client operated on the terminal device, such that the application program client may make adaptive adjustments subsequently based on the predicted QoS parameters, so as to expand the ability of the application program client to acquire and use QoS parameters in a QoS mechanism, thereby improving the transmission efficiency.

Further, referring to FIG. 5, a schematic flowchart of a data processing method provided by an embodiment of the present application is shown. The data processing method may be performed by a terminal device, the terminal device including an application program client and an analysis and prediction function component. As shown in FIG. 5, the data processing method may include at least the following steps.

S301: The terminal device acquires a first function instruction issued by a mobile core network element.

Specifically, the terminal device may acquire the first function instruction issued by the mobile core network element, where the first function instruction is configured to instruct whether the terminal device opens an analysis and prediction function of the analysis and prediction function component to the application program client. In some embodiments, the mobile core network element may be a session management network element (or referred to as a session management function), and may also be other network elements, which will not be limited in the present application.

It can be understood that whether the terminal device opens the analysis and prediction function of the analysis and prediction function component to the application program client is instructed and determined by the mobile core network element. That is, the mobile core network element may further indicate whether an analysis and prediction interface of a relevant QoS flow or network slice is allowed to be opened for the application program client to invoke when the session management network element issues a QoS rule and a corresponding QoS parameter set to the terminal device.

S302: The analysis and prediction function component acquires a parameter acquisition request transmitted by the application program client corresponding to a protocol data unit session.

The specific process of this step may refer to S101 in the embodiment corresponding to FIG. 3, which will not be described again here.

S303: The analysis and prediction function component predicts predicted QoS parameters corresponding to the QoS flow for the application program client based on the QoS parameter prediction request, and transmits the predicted QoS parameters to the application program client, in response to a first function instruction being a function opening instruction.

Specifically, when the first function instruction is the function opening instruction, i.e., the mobile core network element instructs that the analysis and prediction interface may be opened, the analysis and prediction function component may predict, based on the QoS parameter prediction request, predicted QoS parameters corresponding to the QoS flow for the application program client and transmit the predicted QoS parameters to the application program client. The specific process of predicting the predicted QoS parameters corresponding to the QoS flow and transmitting the same to the application program client may refer to S102 in the embodiment corresponding to FIG. 3, which will not be repeated herein. The function opening instruction may instruct the terminal device to open the analysis and prediction function of the analysis and prediction function component to the application program client.

S304: The application program client subscribes to the analysis and prediction function component for a parameter change notification message, and make a notification, based on the parameter prediction notification function, to the application program client in response to the analysis and prediction function component predicting a change trend in target QoS parameters and the predicted QoS parameters exceeding a threshold value.

Specifically, the application program client on the terminal device may subscribe to the analysis and prediction function component for the parameter prediction notification function via the analysis and prediction interface. In a case of successful subscription, the analysis and prediction function component may, in response to the analysis and prediction function component predicting a change trend in target QoS parameters and the predicted QoS parameters exceeding the threshold value, generate a parameter change notification message based on the parameter prediction notification function, and then transmit the parameter change notification message to the application program client via the analysis and prediction interface. Next, the application program client may re-initiate a QoS parameter prediction request to the analysis and prediction function component based on the parameter change notification message. Further, the re-predicted QoS parameters may be transmitted to the application program client via the analysis and prediction interface through the process described in the corresponding embodiment of FIG. 3. The application program client may also further include parameter information such as a maximum number of times of notification and a threshold value corresponding to the predicted QoS parameters in a subscription request. The threshold value may be set according to business requirements, and will not be defined specifically in the present application. By setting the threshold value, the analysis and prediction function component may not need to make a notification via the parameter prediction notification function as soon as a relevant change trend is predicted, but may make a notification in response to the predicted QoS parameter exceeding the threshold value. Therefore, the interference of frequent notification to the application program client and the data interaction between the application program client and the analysis and prediction function component can be reduced.

In some embodiments, when the protocol data unit session is established, the application program client may firstly actively initiate the QoS parameter prediction request to the analysis and prediction function component via the analysis and prediction interface so as to acquire the predicted QoS parameters. However, in response to the application program client subscribing to the analysis and prediction function component for the parameter prediction notification function, the analysis and prediction function component, based on the parameter prediction notification function, actively transmits the predicted QoS parameters or notification information (i.e., a parameter change notification message) indicating the predicted QoS parameters exceeding a threshold value to the application program client when the analysis and prediction function component predicts a change trend in target QoS parameters and the predicted QoS parameters exceed the threshold value.

S305: The analysis and prediction function component transmits request rejection information to the application program client in response to the first function instruction being a function closing instruction. The request rejection information is aimed to the aforementioned parameter prediction request.

Specifically, the analysis and prediction function component may transmit the request rejection information to the application program client via the analysis and prediction interface in response to the first function instruction being the function closing instruction, i.e., when a mobile core network element instructs not to open the analysis and prediction function of the analysis and prediction function component. The function closing instruction is configured to instruct the terminal device not to open the analysis and prediction function of the analysis and prediction function component to the application program client (or not to open the analysis and prediction interface to the application program client). Further, the request rejection information may include a rejection reason identifier (which may also be referred to as a rejection reason value), where the rejection reason identifier is configured to characterize a rejection reason for the QoS parameter prediction request, and is predefined by a network. For example, different rejection reasons may be represented with different numbers. For example, the number "1" represents for subscription not allowed, the number "2" represents for slicing not allowed, the number "3" represents for data network name (DNN) not allowed, the number "4" represents for operator not allowed, etc.

That is, when the mobile core network element instructs that the analysis and prediction function of the analysis and prediction function component cannot be opened, the analysis and prediction function component, upon receiving the QoS parameter prediction request (which may also be referred to as a parameter analysis and prediction request) transmitted by the application program client, may indicate a rejection request in a corresponding response message and may further include a rejection reason value.

According to the indication of the first function instruction, the terminal device may accurately judge which application program clients are opened with the analysis and prediction function and which application program clients are closed with the analysis and prediction function, thereby improving the efficiency of effective analysis and prediction.

It is to be indicated that: when the mobile core network element instructs whether to allow to open the analysis and prediction interface for the application program client to invoke, one or more of the following function indication information may be considered: subscription information about a terminal device, a data network name (DNN) and single network slice selection assistance information (S-NS-SAI) carried upon the initiation of a protocol data unit session, an operator's own configuration, a network policy, etc. For example, any terminal device may/may not allow the analysis and prediction interface to be opened; or for a business which specifies a specific network slice, the business may allow the analysis and prediction interface to be opened. Which permission policy is specifically adopted by the core network element will not be defined in the embodiments of the present application.

In the embodiments of the present application, the terminal device transmits a second function instruction to the mobile core network element, which may accurately notify the mobile core network element of a supporting condition of the terminal device for the analysis and prediction function, so that the mobile core network element may selectively transmit the first function instruction to the terminal device supporting a QoS interface based on the supporting condition of the terminal device, thereby reducing the possibility of invalid transmission of the first function instruction (e.g., transmission to a terminal device which does not support the analysis and prediction function), and improving the interaction efficiency.

Figure 6:
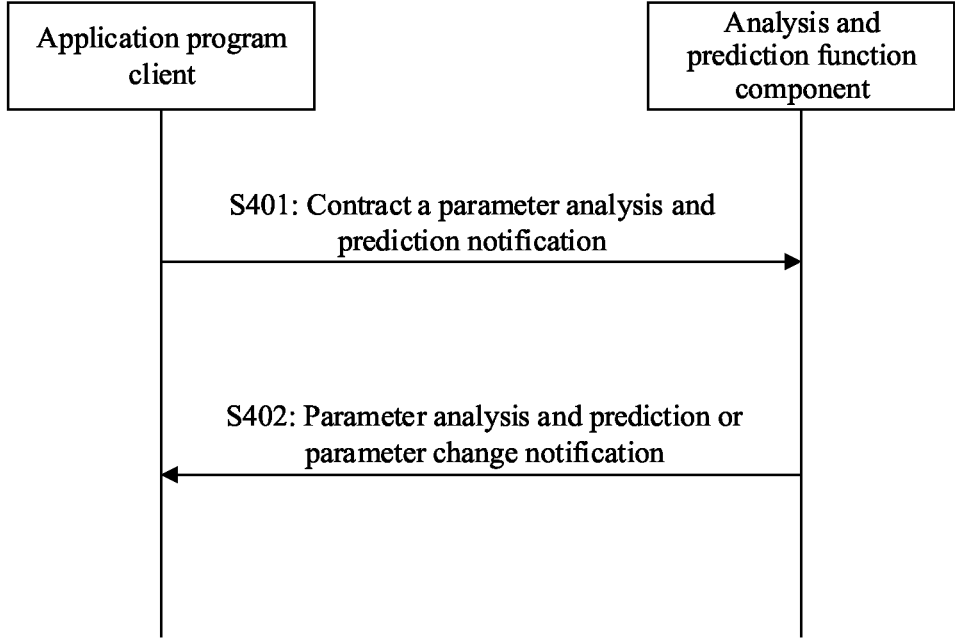
FIG. 6 is a schematic diagram of interactions of a parameter prediction notification process provided by an embodiment of the present application.

Referring to FIG. 6, a schematic diagram of interactions of a parameter prediction notification process provided by an embodiment of the present application is shown. As shown in FIG. 6, the process may include the following steps:

S401: The application program client subscribes to the analysis and prediction function component (or referred to as a UE analysis and prediction function module) for a parameter analysis and prediction notification (i.e., a parameter prediction notification function)

S402: The analysis and prediction function component may make a notification to the application program client via the analysis and prediction interface when the analysis and prediction interface obtains an analysis and prediction result (i.e., predicted QoS parameters) of the QoS flow corresponding to the business flow of the application program client, or a possible change (i.e., a change trend) in the QoS parameters associated with the QoS flow is predicted, or the predicted QoS parameters exceed a threshold value.

It can be seen from the above that upon subscribing the parameter prediction notification function, the application program client may not need to frequently transmit a QoS parameter prediction request to the analysis and prediction function component, but may actively notify the application program client about the possible change in the QoS parameters via the analysis and prediction interface, or transmit the obtained analysis and prediction result or notification information indicating the predicted QoS parameters exceeding the threshold value, when the relevant QoS parameters may change, or the predicted service quality parameter exceeds the threshold value, or a corresponding analysis and prediction result is generated. Therefore, the application program client may directly perceive the possible change in the QoS parameters and improve the acquisition efficiency of the predicted QoS parameters.

Figure 7:
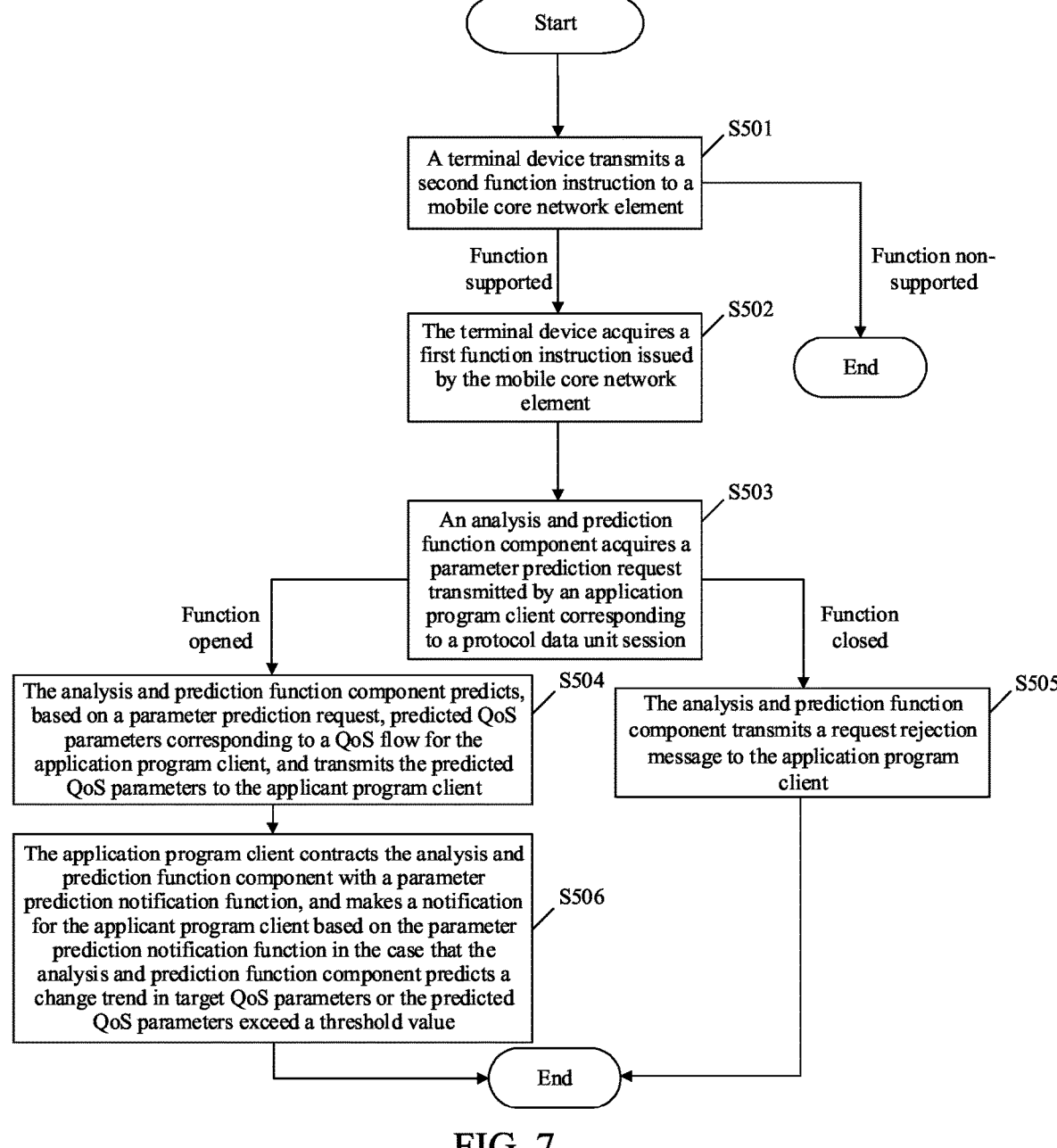
FIG. 7 is a schematic flowchart of a data processing method provided by an embodiment of the present application.

Further, referring to FIG. 7, a schematic flowchart of a data processing method provided by an embodiment of the present application is shown. The data processing method may be performed by a terminal device, the terminal device including an application program client and an analysis and prediction function component. As shown in FIG. 7, the data processing method may include at least the following steps.

S501: The terminal device transmits a second function instruction to a mobile core network element.

Specifically, upon initiating a protocol data unit session, the terminal device may instruct a mobile core network element whether the terminal device supports an analysis and prediction function of the analysis and prediction function component, that is, transmits the second function instruction to the mobile core network element. In one embodiment, the second function instruction may serve as a parameter in N1 SM container. S502 may proceed when the second function instruction transmitted by the terminal device is a function supporting instruction, that is, the terminal device explicitly instructs to support the analysis and prediction function of the analysis and prediction function component. On the contrary, subsequent steps need not be executed and the flow ends, when the second function instruction transmitted by the terminal device is a function non-supporting instruction (i.e., the terminal device instructs not to support the analysis and prediction function of the prediction function component), or when the terminal device does not instruct to support the analysis and prediction function of the prediction function component (i.e., the mobile core network element may consider that the terminal device does not need or does not support the analysis and prediction function). The mobile core network element may be a session management network element, or may also be other network elements, which will not be limited in the present application.

S502: The terminal device acquires a first function instruction issued by the mobile core network element in response to the second function instruction being the function supporting instruction.

Specifically, the mobile core network element may generate the first function instruction based on a permission policy upon detecting the second function instruction being the function supporting instruction, and transmit the first function instruction to the terminal device; and the terminal device may further receive the first function instruction. The specific process of this step may refer to S301 in the embodiment corresponding to FIG. 5, which will not be described again here.

S503: The analysis and prediction function component acquires a parameter acquisition request transmitted by the application program client corresponding to a protocol data unit session.

The specific process of this step may refer to S101 in the embodiment corresponding to FIG. 3, which will not be described again here.

S504: The analysis and prediction function component predicts predicted QoS parameters corresponding to a QoS flow for the application program client based on the QoS parameter prediction request, and transmits the predicted QoS parameters to the application program client, in response to a first function instruction being a function opening instruction.

The specific process of this step may refer to S303 in the embodiment corresponding to FIG. 5, which will not be described again here.

S505: The analysis and prediction function component transmits request rejection information to the application program client in response to the first function instruction being a function closing instruction.

The specific process of this step may refer to S305 in the embodiment corresponding to FIG. 5, which will not be described again here.

S506: The application program client subscribes to the analysis and prediction function component for a parameter prediction notification function, and make a notification, based on the parameter prediction notification function, to the application program client in response to the analysis and prediction function component predicting a change trend in target QoS parameters and the predicted QoS parameters exceeding a threshold value.

The specific process of this step may refer to S304 in the embodiment corresponding to FIG. 5, which will not be described again here.

In the embodiments of the present invention, the relevant QoS parameters may be predicted for the application program client being operated on the terminal device through the interaction between the terminal device and the mobile core network element. Furthermore, the analysis and prediction function component may pre-predict possibly changed QoS parameters for the application program client in response to predicting a change trend in target QoS parameters, or make a notification to the application program client in response to the predicted QoS parameters exceeding the threshold value, such that the application program client may make adaptive adjustments subsequently based on the predicted QoS parameters, so as to expand the ability of the application program client to acquire and use QoS parameters in a QoS mechanism.

Referring to FIG. 8, a schematic flowchart of a data processing method provided by an embodiment of the present application is shown. The data processing method may be performed by a terminal device, the terminal device including an application program client and an analysis and prediction function component. As shown in FIG. 8, the data processing method may include at least the following steps.

S601: The application program client subscribes to an analysis and prediction function component for a parameter prediction notification function for a protocol data unit session, the protocol data unit session being associated with a business data packet provided by the application program client.

Specifically, the application program client subscribes to the analysis and prediction function component for the parameter prediction notification function for the protocol data unit session via an analysis and prediction interface.

Upon successful subscription, the analysis and prediction function component may provide predicted QoS parameters for the application program client. The application program client is operated in a terminal device, the protocol data unit session being associated with a business data packet provided by the application program client.

S602: the analysis and prediction function component predicts predicted QoS parameters corresponding to a QoS flow for the application program client based on the parameter prediction notification function, the QoS flow being associated with the business data packet.

Specifically, the analysis and prediction function component on the terminal device may predict predicted QoS parameters corresponding to the QoS flow for the application program client based on the parameter prediction notification function, the QoS flow being associated with a business data packet provided by the application program client. In one embodiment, the analysis and prediction function component may, based on a QoS flow identifier associated with the application program client, a QoS flow corresponding to the QoS flow identifier by invoking the parameter prediction notification function, and further predict predicted QoS parameters corresponding to the QoS flow based on historical parameter information corresponding to the target QoS parameters. In some embodiments, the analysis and prediction function component may, based on respective network slice selection assistance information associated with the application program client, identify a network slice corresponding to the network slice selection assistance information by invoking the parameter prediction notification function, and further predict the predicted QoS parameters corresponding to the QoS flow based on historical parameter information corresponding to the QoS parameters associated with the network slice in a QoS parameter set. The specific implementation process may refer to S102 in the embodiment corresponding to FIG. 3, which will not be described again here.

S603: The analysis and prediction function component transmits the predicted QoS parameters to the application program client when the predicted QoS parameters are different from target QoS parameters or the predicted QoS parameters exceed a threshold value, the target QoS parameters being issued by a session management network element.

Specifically, the analysis and prediction function component on the terminal device may compare the predicted QoS parameters with the target QoS parameters issued by the session management network element; invoke an analysis and prediction interface through the parameter prediction notification function when the predicted QoS parameters are different from the target QoS parameters (i.e., actual QoS parameters); and then transmit the predicted QoS parameters or notification information indicating that the predicted QoS parameters exceed the threshold value to the application program client via the analysis and prediction interface. The interaction process between the application program client and the analysis and prediction function component may refer to the embodiment corresponding to FIG. 6. In some embodiments, upon comparing the predicted QoS parameters with the target QoS parameters, a judgment based on a confidence level may be considered. For example, the analysis and prediction function component may calculate a confidence level corresponding to the predicted QoS parameters. When the confidence level is greater than a comparison threshold value, it may be considered that the predicted QoS parameters are different from the target QoS parameters. That is, it may be predicted that the target QoS parameters are likely to change (having a larger change trend). The comparison threshold value may be set according to actual needs, and will not be limited in the embodiments of the present application.

In the embodiments of the present invention, the analysis and prediction function component may be supported to actively predict relevant QoS parameters for the application program client by subscribing the parameter prediction notification function, such that the application program client may make adaptive adjustments subsequently based on the predicted QoS parameters, so as to expand the ability of the application program client to acquire and use QoS parameters in a QoS mechanism.

Figure 9:
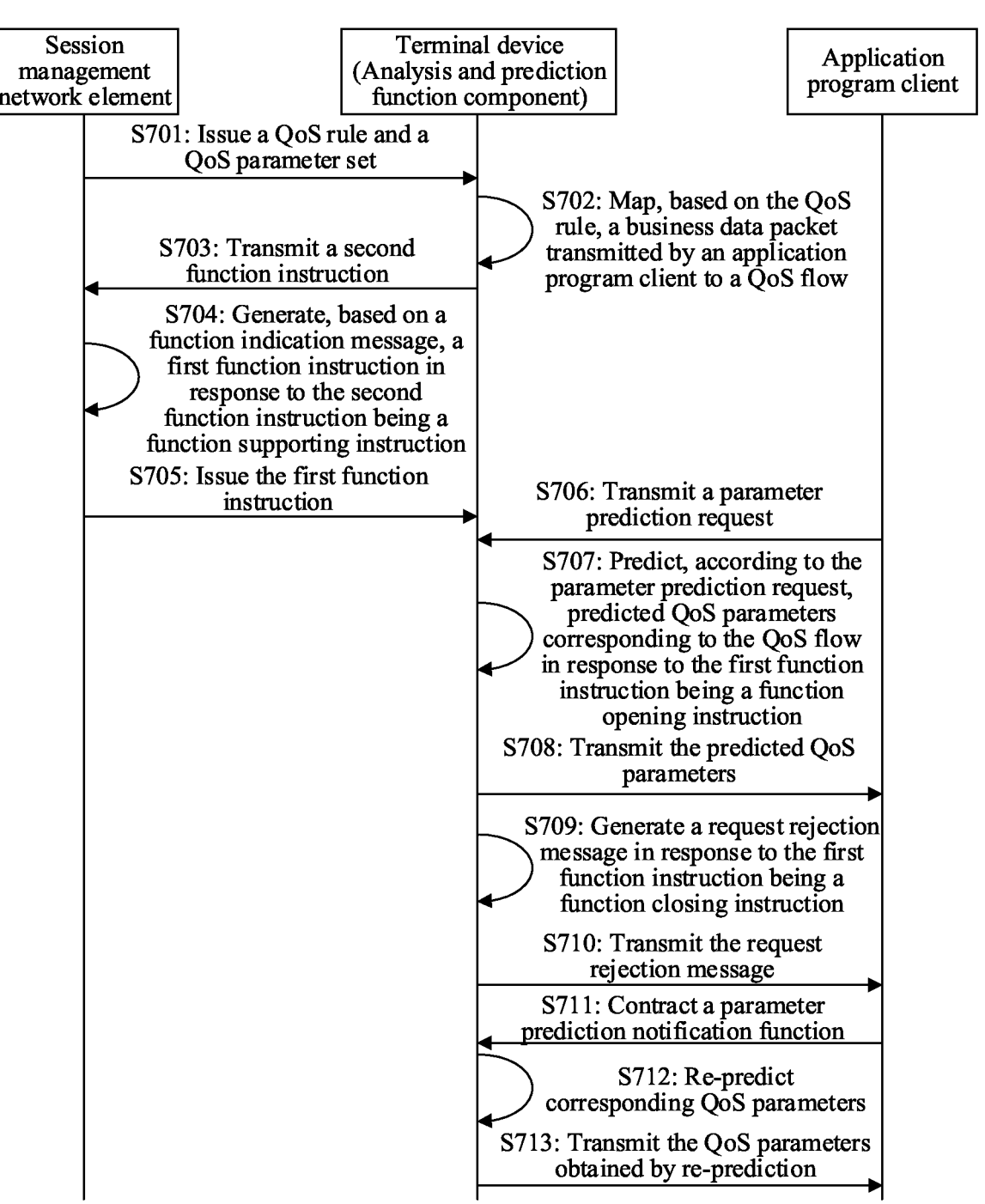
FIG. 9 is a schematic flowchart of a data processing method provided by an embodiment of the present application.

Referring to FIG. 9, a schematic flowchart of a data processing method provided by an embodiment of the present application is shown. The data processing method may be performed jointly by a session management network element, a terminal device (including an analysis and prediction function component), and an application program client being operated on the terminal device. As shown in FIG. 9, the data processing method may include at least the following steps.

S701: The session management network element may issue a QoS rule and a QoS parameter set to the terminal device upon establishing a protocol data unit session.

S702: The terminal device may, in response to receiving the QoS rule and the QoS parameter set, map a business data packet transmitted by the application program client corresponding to the protocol data unit session to a QoS flow based on the QoS rule. The specific process may refer to S102 in the embodiment corresponding to FIG. 3, and will not be repeated herein.

S703: The terminal device may generate a second function instruction and transmit the second function instruction to the session management network element, so as to instruct the session management network element whether the terminal device supports an analysis and prediction function of the analysis and prediction function component.

S704: The session management network element may judge the second function instruction in response to receiving the second function instruction. When the second function instruction is a function supporting instruction, the session management network element may generate a first function instruction based on function indication information, where the function indication information includes, but is not limited to: one or more of subscription information of the terminal device, a data network name and single network slice selection assistance information carried upon a protocol data unit session being initiated, an operator's own configuration and a network policy. The first function instruction may be a function opening instruction or a function closing instruction.

In some embodiments, the session management network element may not generate the first function instruction when the second function instruction is a function unsupported instruction or the terminal device fails to transmit the second function instruction.

S705: The session management network element may issue the generated first function instruction to the terminal device.

S706: The application program client may transmit a QoS parameter prediction request to the analysis and prediction function component on the terminal device.

S707: The terminal device may first judge the first function instruction in response to receiving the QoS parameter prediction request. When the first function instruction is the function opening instruction, the analysis and prediction function component may predict predicted QoS parameters corresponding to a QoS flow for the application program client. The specific process may refer to S303 in the embodiment corresponding to FIG. 5.

S708: The analysis and prediction function component on the terminal device may transmit the predicted QoS parameters to the application program client via an analysis and prediction interface.

S709: The analysis and prediction function component on the terminal device may generate request rejection information in response to the first function instruction being the function closing instruction. The request rejection information is aimed for the QoS parameter prediction request.

S710: The analysis and prediction function component on the terminal device may transmit the request rejection information to the application program client via the analysis and prediction interface.

S711: The application program client may subscribe to the analysis and prediction function component for a parameter prediction notification function.

S712: The analysis and prediction function component on the terminal device may re-predict corresponding QoS parameters for the application program client based on the parameter prediction notification function in response to predicting a change trend in target QoS parameters or the predicted QoS parameters exceeding a threshold value; or transmit notification information indicating the predicted QoS parameters exceeding the threshold value to the application program client.

S713: The analysis and prediction function component on the terminal device may issue the re-predicted QoS parameters to the terminal device via the analysis and prediction interface. In some embodiments, the analysis and prediction function component may first transmit a parameter change notification message to the application program client; and then the application program client may re-initiate a QoS parameter prediction request based on the parameter change notification message, and finally acquire the re-predicted QoS parameters.

In the embodiments of the present invention, relevant QoS parameters may be predicted for the application program client being operated on the terminal device through the interactions among the application program client, the terminal device, the analysis and prediction function component and the session management network element. Furthermore, the analysis and prediction function component may pre-predict possibly changed QoS parameters for the application program client in response to predicting a change trend in the target QoS parameters or the predicted QoS parameters exceeding the threshold value, such that the application program client may make adaptive adjustments subsequently based on the predicted QoS parameters, so as to expand the ability of the application program client to acquire and use QoS parameters in a QoS mechanism.

Figure 10:
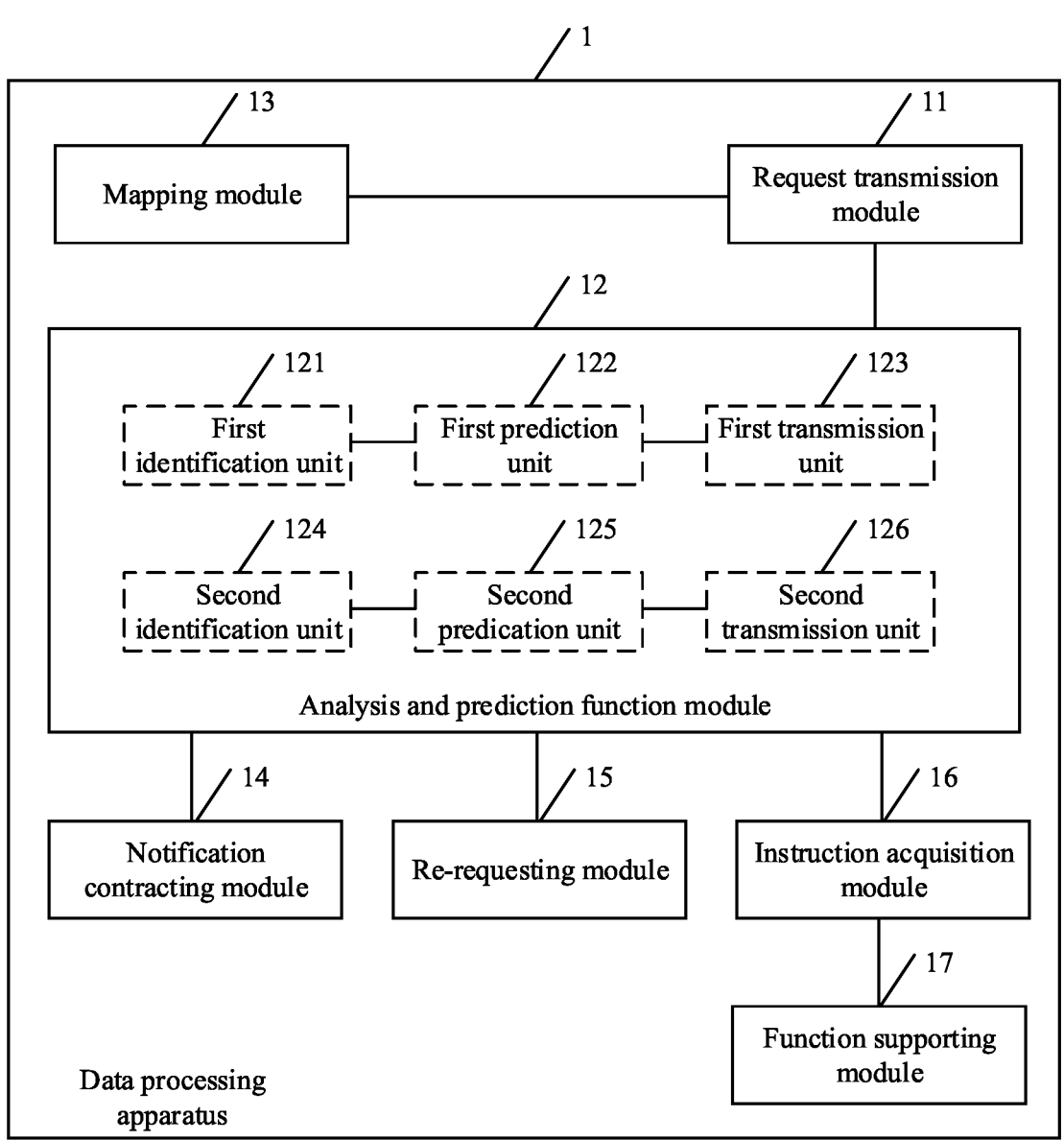
FIG. 10 is a schematic structural diagram of a data processing apparatus provided by an embodiment of the present application.

Referring to FIG. 10, a schematic structural diagram of a data processing apparatus provided by an embodiment of the present application is shown. The data processing apparatus may be a computer program (including a program code) being operated in a computer device. For example, the data processing apparatus may be application software. The apparatus may be configured to perform corresponding steps in a data processing method provided by an embodiment of the present application. As shown in FIG. 10, the data processing apparatus 1 may be operated in a terminal device, and the terminal device may be a terminal device A in the embodiment corresponding to FIG. 2. The data processing apparatus 1 may include: a request transmission module 11 and an analysis and prediction function module 12.

The request transmission module 11 is configured to transmit a QoS parameter prediction request to the analysis and prediction function module 12, the QoS parameter prediction request being generated by an application program client, the application program client being operated in the terminal device.

The analysis and prediction function module 12 is configured to predict predicted QoS parameters corresponding to a QoS flow for the application program client based on the QoS parameter prediction request, and transmit the predicted QoS parameters to the application program client, the QoS flow being associated with a business data packet provided by the application program client.

The specific function implementation of the request transmission module 11 may refer to S101 in the embodiment corresponding to FIG. 3; and the specific function implementation of the analysis and prediction function module 12 may refer to S102 in the embodiment corresponding to FIG. 3, which will not be repeated herein. The analysis and prediction function module 12 here is the analysis and prediction function component in the embodiment corresponding to FIG. 3.

With reference to FIG. 10, the data processing apparatus 1 may further include: a mapping module 13.

The mapping module 13 is configured to receive a QoS rule and a QoS parameter set issued by a session management network element, and map, based on the QoS rule, a business data packet transmitted by the application program client to the QoS flow, the QoS parameter set including target QoS parameters associated with the QoS flow.

The specific function implementation of the mapping module 13 may refer to S102 in the embodiment corresponding to FIG. 3, and will not be repeated herein.

With reference to FIG. 10, the data processing apparatus 1 may further include: a notification subscribing module 14 and a re-requesting module 15.

The notification subscribing module 14 is configured to subscribe to the analysis and prediction function module 12 for a parameter prediction notification function associated with the application program client.

The analysis and prediction function module 12 is further configured to generate a parameter change notification message based on the parameter prediction notification function in response to predicting a change trend in target QoS parameters and the predicted QoS parameters exceeding a threshold value, and transmit the parameter change notification message to the application program client.

The re-requesting module 15 is configured to transmit a QoS parameter prediction request, the QoS parameter prediction request being regenerated by the application program client based on the parameter change notification message.

The specific function implementation of the notification subscribing module 14, the re-requesting module 15 and the analysis and prediction function module 12 may refer to S304 in the embodiment corresponding to FIG. 5, and will not be described again here.

With reference to FIG. 10, the data processing apparatus 1 may further include: an instruction acquisition module 16.

The instruction acquisition module 16 is configured to acquire a first function instruction issued by a mobile core network element.

The analysis and prediction function module 12 is further configured to perform the step of predicting the predicted QoS parameters corresponding to the QoS flow for the application program client based on the QoS parameter prediction request in response to the first function instruction being a function opening instruction. The function opening instruction may instruct the terminal device to open an analysis and prediction function of the analysis and prediction function module 12 to the application program client.

The mobile core network element may be a session management network element.

The specific function implementation of the instruction acquisition module 16 and the analysis and prediction function module 12 may refer to S301 and S303 in the embodiment corresponding to FIG. 5, and will not be repeated herein.

Referring to FIG. 10, the analysis and prediction function module 12 is further configured to transmit request rejection information for the QoS parameter prediction request to the application program client in response to the first function instruction being a function closing instruction. The function closing instruction may instruct the terminal device not to open the analysis and prediction function of the analysis and prediction function module 12 to the application program client.

The specific function implementation of the analysis and prediction function module 12 may refer to S305 in the embodiment corresponding to FIG. 5, and will not be repeated herein.

With reference to FIG. 10, the data processing apparatus 1 may further include: a function supporting module 17.

The function supporting module 17 is further configured to transmit a second function instruction to a mobile core network element. The step of acquiring the first function instruction issued by the network element of the mobile core network is performed in response to the second function instruction being a function supporting instruction. The function supporting instruction instructs the terminal device to support the analysis and prediction function of the analysis and prediction function module 12.

The specific function implementation of the function supporting module 17 may refer to S501 in the embodiment corresponding to FIG. 7, and will not be repeated herein.

With reference to FIG. 10 together, the analysis and prediction function module 12 may include: a first identification unit 121, a first prediction unit 122 and a first transmission unit 123.

The first identification unit 121 is configured to acquire, according to the QoS parameter prediction request, a QoS flow identifier associated with the application program client, and identify a QoS flow corresponding to the QoS flow identifier.

The first prediction unit 122 is configured to predict predicted QoS parameters corresponding to the QoS flow based on historical parameter information corresponding to target QoS parameters.

The first prediction unit 122 is specifically configured to input the historical parameter information corresponding to the target QoS parameters into a parameter prediction model, extract parameter change features corresponding to the historical parameter information through the parameter prediction model, and adjust the target QoS parameters based on the parameter change features to obtain the predicted QoS parameters corresponding to the QoS flow.

The first transmission unit 123 is configured to transmit the predicted QoS parameters to the application program client.

In one implementation, the application program client is a client performing a streaming business.

The first transmission unit 123 is specifically configured to transmit a parameter prediction response message containing the predicted QoS parameters to the application program client, so that the application program client adjusts an encoding algorithm based on the predicted QoS parameters, and generates an optimized business data packet based on the adjusted encoding algorithm and streaming data.

The specific function implementation of the first identification unit 121, the first prediction unit 122 and the first transmission unit 123 may refer to S102 in the embodiment corresponding to FIG. 3, and will not be repeated herein.

With reference to FIG. 10 together, the analysis and prediction function module 12 may include: a second identification unit 124, a second prediction unit 125 and a second transmission unit 126.

The second identification unit 124 is configured to acquire network slice selection assistance information associated with the application program client according to the QoS parameter prediction request, and identify a network slice corresponding to the network slice selection assistance information.

The second prediction unit 125 is configured to predict predicted QoS parameters corresponding to the QoS flow based on historical parameter information corresponding to QoS parameters associated with a network slice in the QoS parameter set, the QoS parameters associated with the network slice including the target QoS parameters.

The second transmission unit 126 is configured to transmit the predicted QoS parameters to the application program client.

In one implementation, the application program client is a client performing a streaming business.

The second transmission unit 126 is specifically configured to transmit a parameter prediction response message containing the predicted QoS parameters to the application program client, so that the application program client adjusts an encoding algorithm based on the predicted QoS parameters, and generates an optimized business data packet based on the adjusted encoding algorithm and streaming data.

The specific function implementation of the second identification unit 124, the second prediction unit 125 and the second transmission unit 126 may refer to S102 in the embodiment corresponding to FIG. 3, and will not be repeated herein.

In the embodiments of the present application, the application program client corresponding to the protocol data unit session on the terminal device may be supported to transmit the QoS parameter prediction request to the analysis and prediction function component. Further, the analysis and prediction function component may the predict predicted QoS parameters corresponding to the QoS flow for the application program client based on the QoS parameter prediction request, and finally transmit the predicted QoS parameters to the application program client. It can thus be seen that the analysis and prediction function component may predict the corresponding QoS parameters for the application program client in response to the QoS parameter prediction request transmitted by the application program client operated on the terminal device, such that the application program client may make adaptive adjustments subsequently based on the predicted QoS parameters, so as to expand the ability of the application program client to perceive and predict QoS parameters in a QoS mechanism.

Figure 11:
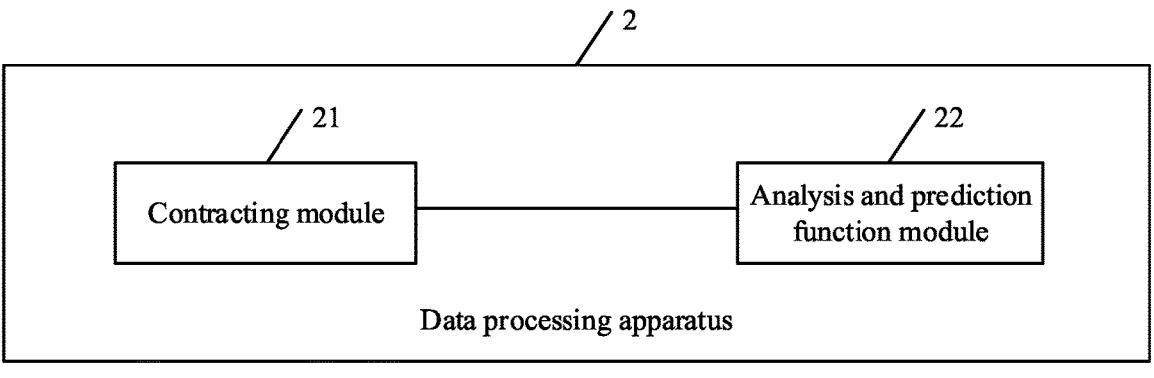
FIG. 11 is a schematic structural diagram of a data processing apparatus provided by an embodiment of the present application.

Referring to FIG. 11, a schematic structural diagram of a data processing apparatus provided by an embodiment of the present application is shown. The data processing apparatus may be a computer program (including a program code) being operated in a computer device. For example, the data processing apparatus may be application software. The apparatus may be configured to perform corresponding steps in a data processing method provided by an embodiment of the present application. As shown in FIG. 11, the data processing apparatus 2 may be operated in a terminal device, and the terminal device may be a terminal device A in the embodiment corresponding to FIG. 2. The data processing apparatus 2 may include: a subscribing module 21 and an analysis and prediction function module 22.

The subscribing module 21 is configured to subscribe to the analysis and prediction function module for a parameter prediction notification function associated with an application program client, the application program client being a client corresponding to a protocol data unit session and operated in the terminal device.

The analysis and prediction function module 22 is configured to predict predicted QoS parameters corresponding to a QoS flow for the application program client based on the parameter prediction notification function, the QoS flow being associated with a business data packet provided by the application program client.

The analysis and prediction function module 22 is further configured to transmit the predicted QoS parameters to the application program client when the predicted QoS parameters are different from QoS parameters or the predicted QoS parameters exceed a threshold value; and the target QoS parameters being issued by a session management network element.

The specific function implementation of the subscribing module 21 may refer to S601 in the embodiment corresponding to FIG. 8; and the specific function implementation of the analysis and prediction function module 22 may refer to S602-S603 in the embodiment corresponding to FIG. 8, which will not be repeated herein. The analysis and prediction function module 22 here is the analysis and prediction function component in the embodiment corresponding to FIG. 8.

In the embodiments of the present invention, the analysis and prediction function component may be supported to actively predict relevant QoS parameters for the application program client by subscribing the parameter prediction notification function, such that the application program client may make adaptive adjustments subsequently based on the predicted QoS parameters, so as to expand the ability of the application program client to acquire and use QoS parameters in a QoS mechanism.

Figure 12:
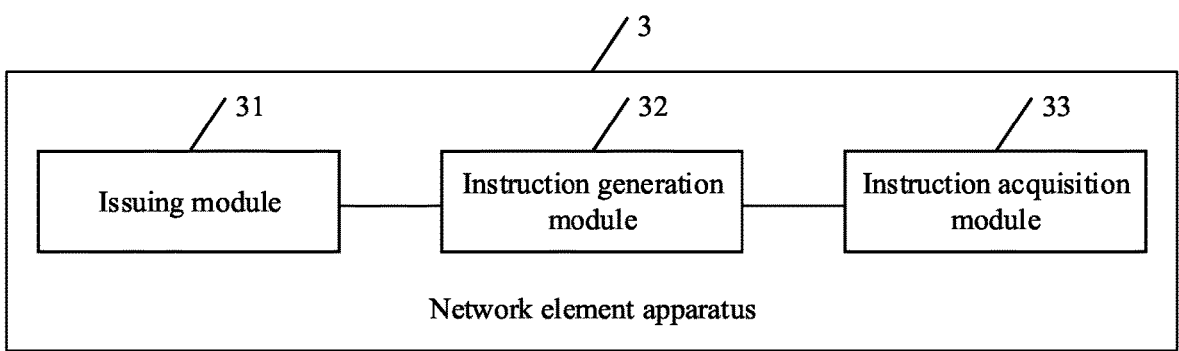
FIG. 12 is a schematic structural diagram of a network element apparatus provided by an embodiment of the present application.

Referring to FIG. 12, a schematic structural diagram of a network element apparatus provided by an embodiment of the present application is shown. The network element apparatus may be a computer program (including a program code) being operated in a network element device. For example, the network element apparatus may be application software. The apparatus may be configured to perform corresponding steps in a data processing method provided by an embodiment of the present application. As shown in FIG. 12, the network element apparatus 3 may be operated in a session management network element. The network element apparatus 3 may include: an issuing module 31.

The issuing module 31 is configured to issue a QoS rule and a QoS parameter set to a terminal device, such that the terminal device maps, based on the QoS rule, a business data packet transmitted by an application program client corresponding a protocol data unit session to a QoS flow, the terminal device including the application program client and an analysis and prediction function component, the application program client having a function of generating a QoS parameter prediction request, the QoS parameter prediction request instructing the analysis and prediction function component to transmit predicted QoS parameters corresponding to the QoS flow to the application program client, the predicted QoS parameters being predicted by the analysis and prediction function component for the business data packet based on the QoS parameter prediction request; and the QoS parameter set including target QoS parameters.

The specific function implementation of the issuing module 31 may refer to S701 in the embodiment corresponding to FIG. 9, and will not be repeated herein.

With reference to FIG. 12 together, the network element apparatus 3 may further include: an instruction generation module 32.

The instruction generation module 32 is configured to generate a first function instruction based on function indication information, and issue the first function instruction to the terminal device, the first function instruction being a function opening instruction or a function closing instruction. The function opening instruction instructs the terminal device to open an analysis and prediction function of the analysis and prediction function component to the application program client. The function closing instruction instructs the terminal device not to open the analysis and prediction function of the analysis and prediction function component to the application program client.

The specific function implementation of the instruction generation module 32 may refer to S704 in the embodiment corresponding to FIG. 9, and will not be repeated herein.

With reference to FIG. 12 together, the network element apparatus 3 may further include: an instruction acquisition module 33.

The instruction acquisition module 33 is configured to acquire a second function instruction transmitted by the terminal device. The step of generating the first function instruction based on the function indication information is performed in response to the second function instruction being a function supporting instruction. The function supporting instruction instructs the terminal device to support the analysis and prediction function of the analysis and prediction function component.

The specific function implementation of the instruction acquisition module 33 may refer to S703-S704 in the embodiment corresponding to FIG. 9, and will not be repeated herein.

In the embodiments of the present invention, relevant QoS parameters may be predicted for the application program client being operated on the terminal device through the interactions among the application program client, the terminal device, the analysis and prediction function component and the session management network element. Furthermore, the analysis and prediction function component may pre-predict possibly changed QoS parameters for the application program client in response to predicting a change trend in the target QoS parameters or the predicted QoS parameters exceeding the threshold value, such that the application program client may make adaptive adjustments subsequently based on the predicted QoS parameters, so as to expand the ability of the application program client to acquire and use QoS parameters in a QoS mechanism.

Figure 13:
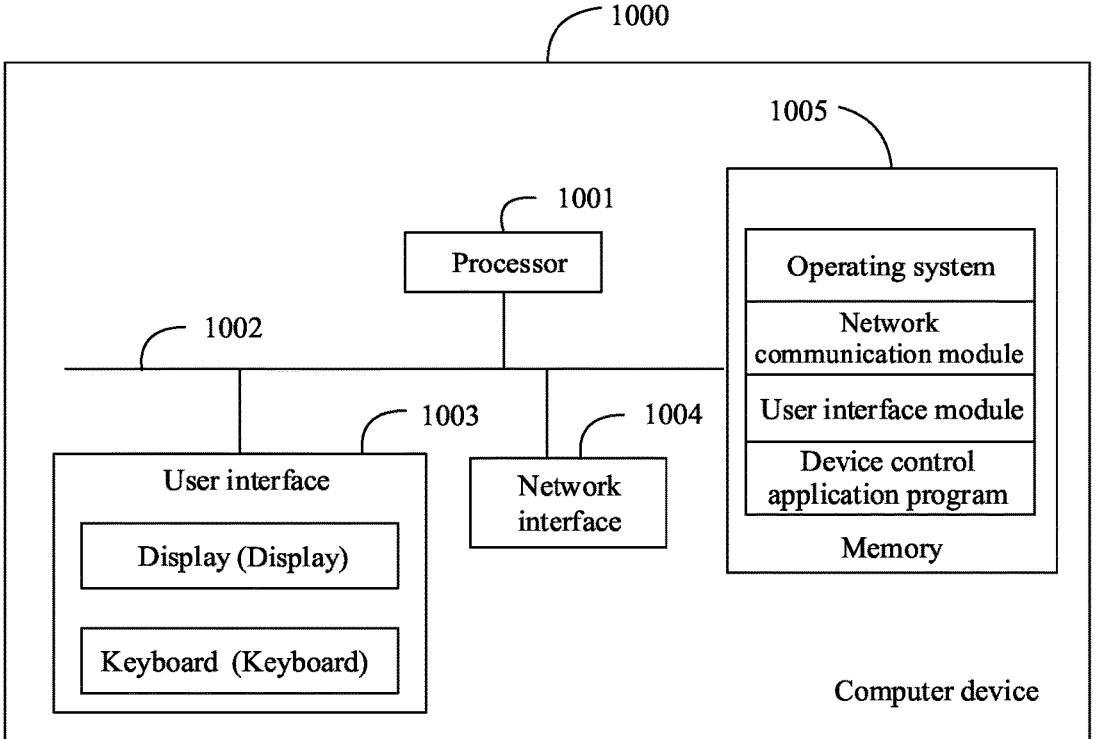
FIG. 13 is a schematic structural diagram of a computer device according to an embodiment of the present application.

Referring to FIG. 13, a schematic structural diagram of a computer device provided by an embodiment of the present application is shown. As shown in FIG. 13, the computer device 1000 may include: a processor 1001, a network interface 1004 and a memory 1005. Moreover, the computer device 1000 may further include: a user interface 1003, and at least one communication bus 1002. The communication bus 1002 is configured to implement connection communication between these components. The user interface 1003 may include a display, and a keyboard. In some embodiments, the user interface 1003 may further include a standard wired interface, and a wireless interface. In some embodiments, the network interface 1004 may include a standard wired interface, and a wireless interface (e.g., WI-FI interface) The memory 1004 may be a high-speed RAM memory, or a non-volatile memory, such as at least one disk memory. In some embodiments, the memory 1005 may also be at least one storage apparatus located remotely from the aforementioned processor 1001. As shown in FIG. 13, the memory 1005, as a non-transitory computer-readable storage medium, may include an operating system, a network communication module, a user interface module, and a device control application program. In an embodiment of the present application, the computer device 1000 may be a terminal device.

In the computer device 1000 as shown in FIG. 13, the network interface 1004 may provide a network communication function. The user interface 1003 is mainly configured to provide an interface for a user to input. The processor 1001 may be configured to invoke the device control application program stored in the memory 1005, such that the computer device 1000 performs the description of the data processing method in the embodiment shown in any of FIG. 3, FIG. 5, FIG. 7, FIG. 8 and FIG. 9, or the description of the data processing apparatus 1 in the embodiment corresponding to FIG. 10, or the description of the data processing apparatus 2 in the embodiment corresponding to FIG. 11, which will not be repeated here. In addition, the description of beneficial effects of the same method are not described again here.

Figure 14:
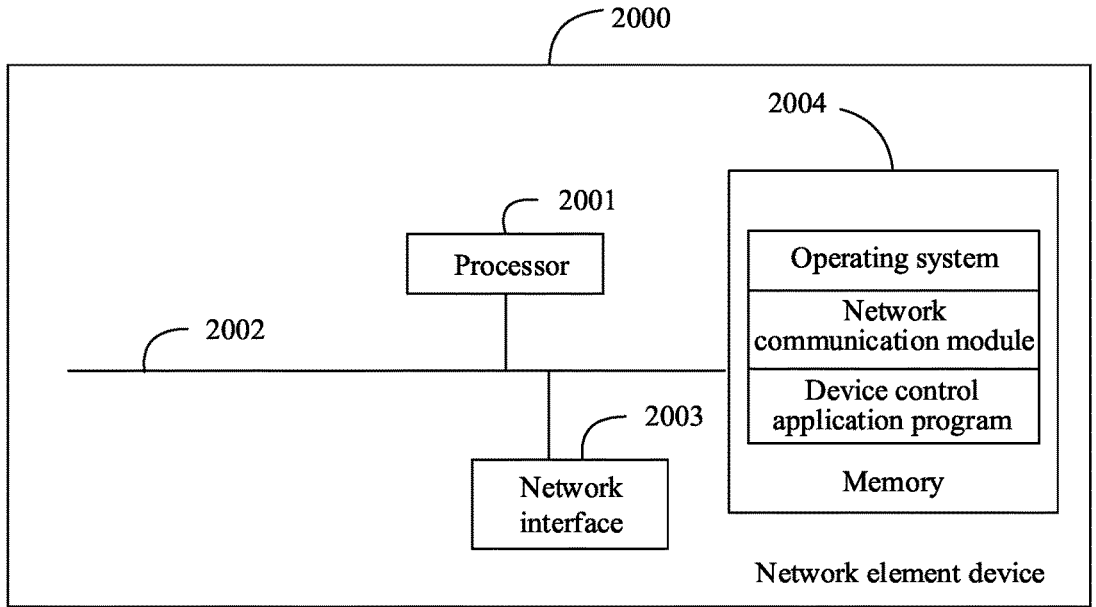
FIG. 14 is a schematic structural diagram of a network element device provided by an embodiment of the present application.

Referring to FIG. 14, a schematic structural diagram of a network element device provided by an embodiment of the present application is shown. As shown in FIG. 14, the network element device 2000 may include: a processor 2001, a network interface 2003 and a memory 2004. Moreover, the network element device 2000 further includes: at least one communication bus 2002. The communication bus 2002 is configured to implement connection communication between these components. In some embodiments, the network interface 2003 may include a standard wired interface, and a wireless interface (e.g., WI-FI interface). The memory 2004 may be a high-speed RAM memory, or a non-volatile memory, such as at least one disk memory. In some embodiments, the memory 2004 may also be at least one storage apparatus located remotely from the aforementioned processor 2001. As shown in FIG. 14, the memory 2004, as a non-transitory computer-readable storage medium, may include an operating system, a network communication module, and a device control application program. In an embodiment of the present application, the network element device 2000 may be a session management network element.

In the network element device 2000 as shown in FIG. 14, the network interface 2003 may provide a network communication function. The processor 2001 may be configured to invoke the device control application program stored in the memory 2004, such that the network element device 2000 performs the description of the data processing method in the embodiment shown in the embodiment corresponding to FIG. 9, or the description of the network element apparatus 3 in the embodiment corresponding to FIG. 12, which will not be repeated here. In addition, the description of beneficial effects of the same method are not described again here.

Furthermore, it is to be pointed out here that: An embodiment of the present application further provides a non-transitory computer-readable storage medium, which is configured to store the aforementioned computer program executed by the data processing apparatus 1 or data processing apparatus 2 or network element apparatus 3. The computer program includes program instructions, which, when being performed by the processor, can perform the description of the data processing method in any embodiment corresponding to FIG. 3, FIG. 5, FIG. 7, FIG. 8, and FIG. 9, which will not be repeated herein. In addition, the description of beneficial effects of the same method are not described again here. For technical details that are not disclosed in the computer-readable storage medium embodiment of the present application, please refer to the method embodiment of the present application.

The computer-readable storage medium may be a data processing apparatus or network element apparatus provided by any of the foregoing embodiments, or an internal storage unit of the computer device or network element device described above, such as a hard disk or an internal memory of the computer device. The computer-readable storage medium may also be an external storage device of the computer device (or network element device), such as a plug-in hard disk, a smart media card (SMC), a secure digital (SD) card, a flash card, etc. provided on the computer device. Further, the computer-readable storage medium may also include both an internal storage unit and an external storage device of the computer device (or network element device). The computer-readable storage medium is configured to store a computer program as well as other programs and data required by the computer device (or network element device). The computer-readable storage medium may also be configured to temporarily store data that has been or will be outputted.

Furthermore, it is to be pointed out here that: an embodiment of the present application further provides a computer program product or a computer program, which includes a computer instruction stored in a non-transitory computer-readable storage medium. A processor of a computer device reads the computer instruction from the computer-readable storage medium, and the processor executes the computer instruction to cause the computer device to perform the method provided by the embodiment corresponding to any of FIG. 3, FIG. 5, FIG. 7, FIG. 8 and FIG. 9. In addition, the processor of the network element device may also read the computer instruction from the computer-readable storage medium, and the processor executes the computer instruction to cause the network element device to perform the method provided by the embodiment corresponding to FIG. 9.

Figure 15:
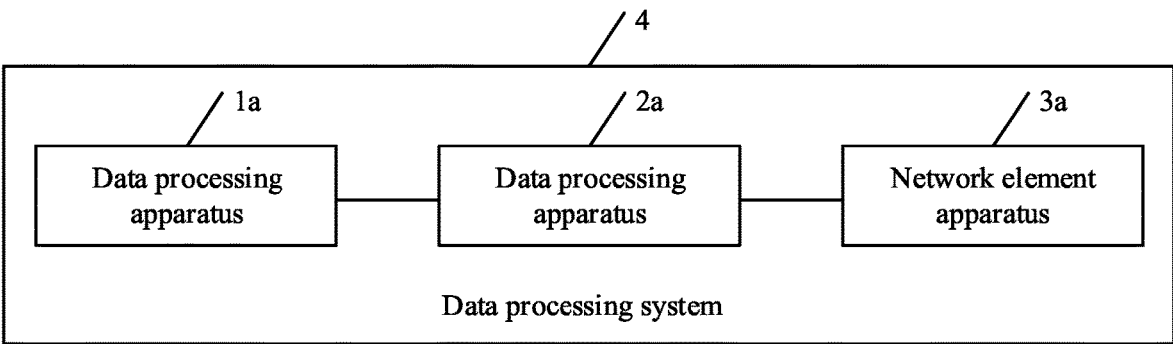
FIG. 15 is a schematic structural diagram of a data processing system provided by an embodiment of the present application.

Further, referring to FIG. 15, a schematic structural diagram of a data processing system provided by an embodiment of the present application is shown. The data processing system 4 may include a data processing apparatus 1a, a data processing apparatus 2a and a network element apparatus 3a. Here, the data processing apparatus 1a may be the data processing apparatus 1 in the embodiment corresponding to FIG. 10. It will be understood that the data processing apparatus 1a may be integrated in the terminal device A in the embodiment corresponding to FIG. 2, which will not be repeated herein. Here, the data processing apparatus 2a may be the data processing apparatus 2 in the embodiment corresponding to FIG. 11. It will be understood that the data processing apparatus 2a may be integrated in the terminal device A in the embodiment corresponding to FIG. 2, which will not be repeated herein. The network element apparatus 3a may be the network element apparatus 3 in the embodiment corresponding to FIG. 12, which will not be repeated herein. In addition, the description of beneficial effects of the same method are not described again here. For technical details that are not disclosed in the data processing system embodiment of the present application, please refer to the method embodiment of the present application.

The terms "first", "second" and the like in the description and claims, as well as the above-mentioned drawings, in the embodiments of the present application are configured to distinguish similar objects, but not necessarily used to describe a specific order. In addition, the terms "comprising/including" and any changes thereof are intended to override non-exclusive inclusions. For example, a process, method, apparatus, product or device that includes a list of steps or unit is not limited to the listed steps or modules, but may optionally include additional steps or modules not listed, or may optionally include additional step unit inherent to such process, method, apparatus, product or device.

Those of ordinary skill in the art may be aware that the units and algorithm steps described in combination with each example described in embodiments disclosed herein may be implemented by electronic hardware, computer software, or a combination thereof. In order to clearly illustrate the interchangeability of hardware and software, the composition and steps of each example have been generally described in accordance with the functions in the above description. Whether such functions are implemented by means of hardware or software depends upon the particular application and design constraints imposed on the technical solutions. Professional technical personnel may use different methods for each particular application to achieve the described functions, but such implementation is to not be considered beyond the scope of the present application.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The above disclosure is only exemplary embodiments of the present application, and of course, may not be used to limit the scope of the rights of the present application. Therefore, the equivalent changes made according to the claims of the present application are still within the scope of the present application.

What is claimed is:

1. A data processing method performed by a computer device acting as a terminal device, the terminal device comprising an application program client and an analysis and prediction function component, the method comprising:

subscribing, by the application program client, to the analysis and prediction function component for a parameter change notification function;

generating, by the application program client, a first QoS parameter prediction request, and transmitting the first QoS parameter prediction request to the analysis and prediction function component;

predicting, by the analysis and prediction function component, QoS parameters corresponding to a QoS flow for the application program client based on the first QoS parameter prediction request, the QoS flow being associated with a business data packet provided by the application program client;

in response to the analysis and prediction function component predicting a change trend in the predicted QoS parameters corresponding to the QoS flow for the application program client or the predicted QoS parameters exceeding a predefined threshold value:

generating a parameter change notification message including the predicted QoS parameters according to the parameter change notification function subscribed by the application program client; and transmitting the parameter change notification message including the predicted QoS parameters to the application program client; and adaptively adjusting, by the application program client, transmission parameters of the business data packet provided by the application program client according to the parameter change notification message; and generating, by the application program client, a second QoS parameter prediction request based on the adaptive adjustment of the transmission parameters, and transmitting the second QoS parameter prediction request to the analysis and prediction function component for re-predicting, by the analysis and prediction function component, QoS parameters corresponding to the adjusted transmission parameters of the business data packet provided by the application program client.

2. The method according to claim 1, further comprising:

receiving, by the terminal device, a QoS rule and a QoS parameter set issued by a session management network element, and mapping, based on the QoS rule, a business data packet transmitted by the application program client to the QoS flow, the QoS parameter set comprising target QoS parameters associated with the QoS flow.

3. The method according to claim 2, wherein the predicting, by the analysis and prediction function component, QoS parameters corresponding to a QoS flow for the application program client based on the QoS parameter prediction request, and transmitting the predicted QoS parameters to the application program client comprises:

acquiring, by the analysis and prediction function component, a QoS flow identifier associated with the application program client according to the QoS parameter prediction request, the QoS flow identifier being used for identifying the corresponding QoS flow;

predicting, by the analysis and prediction function component, QoS parameters corresponding to the QoS flow based on historical parameter information corresponding to the target QoS parameters; and transmitting, by the analysis and prediction function component, the predicted QoS parameters to the application program client.

4. The method according to claim 2, wherein the predicting, by the analysis and prediction function component, QoS parameters corresponding to a QoS flow for the application program client based on the QoS parameter prediction request, and transmitting the predicted QoS parameters to the application program client comprises:

acquiring, by the analysis and prediction function component, a network slice selection assistance information associated with the application program client according to the QoS parameter prediction request, and identifying a network slice corresponding to the network slice selection assistance information;

predicting, by the analysis and prediction function component, the QoS parameters corresponding to the QoS flow based on historical parameter information corresponding to QoS parameters associated with the network slice in the QoS parameter set, the QoS parameters associated with the network slice comprising the target QoS parameters; and transmitting, by the analysis and prediction function component, the predicted QoS parameters to the application program client.

5. The method according to claim 1, further comprising:

acquiring, by the terminal device, a first function instruction issued by a mobile core network element;

performing, by the analysis and prediction function component, the step of predicting predicted QoS parameters corresponding to a QoS flow for the application program client based on the QoS parameter prediction request in response to the first function instruction being a function opening instruction; and instructing, through the function opening instruction, the terminal device to open an analysis and prediction function of the analysis and prediction function component to the application program client.

6. The method according to claim 5, further comprising:

transmitting, by the analysis and prediction function component, a request rejection information for the QoS parameter prediction request to the application program client in response to the first function instruction being a function closing instruction; and instructing, through the function closing instruction, the terminal device not to open the analysis and prediction function of the analysis and prediction function component to the application program client.

7. The method according to claim 5, further comprising:

transmitting, by the terminal device, a second function instruction to the mobile core network element;

performing, by the terminal device, the step of acquiring a first function instruction issued by a mobile core network element in response to the second function instruction being a function supporting instruction; and instructing, by the function supporting instruction, the terminal device to support the analysis and prediction function of the analysis and prediction function component.

8. A computer device acting as a terminal device, comprising: a processor, a memory, and a network interface;

the processor is connected to the memory and the network interface, wherein the network interface is configured to provide a data communication function, the memory is configured to store a program code that, when executed by the processor, causes the computer device to perform a data processing method, the terminal device comprising an application program client and an analysis and prediction function component, the method including:

subscribing, by the application program client, to the analysis and prediction function component for a parameter change notification function;

generating, by the application program client, a first QoS parameter prediction request, and transmitting the first QoS parameter prediction request to the analysis and prediction function component;

predicting, by the analysis and prediction function component, QoS parameters corresponding to a QoS flow for the application program client based on the first QoS parameter prediction request, the QoS flow being associated with a business data packet provided by the application program client;

in response to the analysis and prediction function component predicting a change trend in the predicted QoS parameters corresponding to the QoS flow for the application program client or the predicted QoS parameters exceeding a predefined threshold value:

generating a parameter change notification message including the predicted QoS parameters according to the parameter change notification function subscribed by the application program client; and transmitting the parameter change notification message including the predicted QoS parameters to the application program client; and adaptively adjusting, by the application program client, transmission parameters of the business data packet provided by the application program client according to the parameter change notification message; and generating, by the application program client, a second QoS parameter prediction request based on the adaptive adjustment of the transmission parameters, and transmitting the second QoS parameter prediction request to the analysis and prediction function component for re-predicting, by the analysis and prediction function component, QoS parameters corresponding to the adjusted transmission parameters of the business data packet provided by the application program client.

9. The computer device according to claim 8, wherein the method further comprises:

receiving, by the terminal device, a QoS rule and a QoS parameter set issued by a session management network element, and mapping, based on the QoS rule, a business data packet transmitted by the application program client to the QoS flow, the QoS parameter set comprising target QoS parameters associated with the QoS flow.

10. The computer device according to claim 9, wherein the predicting, by the analysis and prediction function component, QoS parameters corresponding to a QoS flow for the application program client based on the QoS parameter prediction request, and transmitting the predicted QoS parameters to the application program client comprises:

acquiring, by the analysis and prediction component, a QoS flow identifier associated with the application program client according to the QoS parameter prediction request, the QoS flow identifier being used for identifying the corresponding QoS flow;

predicting, by the analysis and prediction function component, QoS parameters corresponding to the QoS flow based on historical parameter information corresponding to the target QoS parameters; and transmitting, by the analysis and prediction function component, the predicted QoS parameters to the application program client.

11. The computer device according to claim 9, wherein the predicting, by the analysis and prediction function component, QoS parameters corresponding to a QoS flow for the application program client based on the QoS parameter prediction request, and transmitting the predicted QoS parameters to the application program client comprises:

acquiring, by the analysis and prediction component, a network slice selection assistance information associated with the application program client according to the QoS parameter prediction request, and identifying a network slice corresponding to the network slice selection assistance information;

predicting, by the analysis and prediction function component, the QoS parameters corresponding to the QoS flow based on historical parameter information corresponding to QoS parameters associated with the network slice in the QoS parameter set, the QoS parameters associated with the network slice comprising the target QoS parameters; and transmitting, by the analysis and prediction function component, the predicted QoS parameters to the application program client.

12. The computer device according to claim 8, wherein the method further comprises:

acquiring, by the terminal device, a first function instruction issued by a mobile core network element;

performing, by the analysis and prediction function component, the step of predicting predicted QoS parameters corresponding to a QoS flow for the application program client based on the QoS parameter prediction request in response to the first function instruction being a function opening instruction; and instructing, through the function opening instruction, the terminal device to open an analysis and prediction function of the analysis and prediction function component to the application program client.

13. The computer device according to claim 12, wherein the method further comprises:

transmitting, by the analysis and prediction function component, a request rejection information for the QoS parameter prediction request to the application program client in response to the first function instruction being a function closing instruction; and instructing, through the function closing instruction, the terminal device not to open the analysis and prediction function of the analysis and prediction function component to the application program client.

14. The computer device according to claim 12, wherein the method further comprises:

transmitting, by the terminal device, a second function instruction to the mobile core network element;

performing, by the terminal device, the step of acquiring a first function instruction issued by a mobile core network element in response to the second function instruction being a function supporting instruction; and instructing, by the function supporting instruction, the terminal device to support the analysis and prediction function of the analysis and prediction function component.

15. A non-transitory computer-readable storage medium having stored therein a computer program therein that, when executed by a processor of a computer device acting as a terminal device, causes the computer device to perform a data processing method, the terminal device comprising an application program client and an analysis and prediction function component, the method including:

subscribing, by the application program client, to the analysis and prediction function component for a parameter change notification function;

generating, by the application program client, a first QoS parameter prediction request, and transmitting the first QoS parameter prediction request to the analysis and prediction function component;

predicting, by the analysis and prediction function component, QoS parameters corresponding to a QoS flow for the application program client based on the first QoS parameter prediction request, the QoS flow being associated with a business data packet provided by the application program client;

in response to the analysis and prediction function component predicting a change trend in the predicted QoS parameters corresponding to the QoS flow for the application program client or the predicted QoS parameters exceeding a predefined threshold value:

generating a parameter change notification message including the predicted QoS parameters according to the parameter change notification function subscribed by the application program client; and transmitting the parameter change notification message including the predicted QoS parameters to the application program client; and adaptively adjusting, by the application program client, transmission parameters of the business data packet provided by the application program client according to the parameter change notification message; and generating, by the application program client, a second QoS parameter prediction request based on the adaptive adjustment of the transmission parameters, and transmitting the second QoS parameter prediction request to the analysis and prediction function component for re-predicting, by the analysis and prediction function component, QoS parameters corresponding to the adjusted transmission parameters of the business data packet provided by the application program client.

16. The non-transitory computer-readable storage medium according to claim 15, wherein the method further comprises:

receiving, by the terminal device, a QoS rule and a QoS parameter set issued by a session management network element, and mapping, based on the QoS rule, a business data packet transmitted by the application program client to the QoS flow, the QoS parameter set comprising target QoS parameters associated with the QoS flow.

17. The non-transitory computer-readable storage medium according to claim 16, wherein the predicting, by the analysis and prediction function component, QoS parameters corresponding to a QoS flow for the application program client based on the QoS parameter prediction request, and transmitting the predicted QoS parameters to the application program client comprises:

acquiring, by the analysis and prediction function component, a QoS flow identifier associated with the application program client according to the QoS parameter prediction request, the QoS flow identifier being used for identifying the corresponding QoS flow;

predicting, by the analysis and prediction function component, QoS parameters corresponding to the QoS flow based on historical parameter information corresponding to the target QoS parameters; and transmitting, by the analysis and prediction function component, the predicted QoS parameters to the application program client.

18. The non-transitory computer-readable storage medium according to claim 16, wherein the predicting, by the analysis and prediction function component, QoS parameters corresponding to a QoS flow for the application program client based on the QoS parameter prediction request, and transmitting the predicted QoS parameters to the application program client comprises:

acquiring, by the analysis and prediction function component, a network slice selection assistance information associated with the application program client according to the QoS parameter prediction request, and identifying a network slice corresponding to the network slice selection assistance information;

predicting, by the analysis and prediction function component, the QoS parameters corresponding to the QoS flow based on historical parameter information corresponding to QoS parameters associated with the network slice in the QoS parameter set, the QoS parameters associated with the network slice comprising the target QoS parameters; and transmitting, by the analysis and prediction function component, the predicted QoS parameters to the application program client.

19. The non-transitory computer-readable storage medium according to claim 15, wherein the method further comprises:

acquiring, by the terminal device, a first function instruction issued by a mobile core network element;

performing, by the analysis and prediction function component, the step of predicting predicted QoS parameters corresponding to a QoS flow for the application program client based on the QoS parameter prediction request in response to the first function instruction being a function opening instruction; and instructing, through the function opening instruction, the terminal device to open an analysis and prediction function of the analysis and prediction function component to the application program client.

20. The non-transitory computer-readable storage medium according to claim 19, wherein the method further comprises:

transmitting, by the terminal device, a second function instruction to the mobile core network element;

performing, by the terminal device, the step of acquiring a first function instruction issued by a mobile core network element in response to the second function instruction being a function supporting instruction; and instructing, by the function supporting instruction, the terminal device to support the analysis and prediction function of the analysis and prediction function component.

* * * * *